(12) United States Patent
Vosters et al.

(10) Patent No.: US 12,030,237 B2
(45) Date of Patent: Jul. 9, 2024

(54) MASKING REMOVAL MACHINES, AND METHODS OF MASKING REMOVAL

(71) Applicant: Cardinal IG Company, Eden Prairie, MN (US)

(72) Inventors: Eric E. Vosters, Spring Green, WI (US); Michael J. Milewski, Poynette, WI (US); Robert C. Buchanan, Spring Green, WI (US)

(73) Assignee: CARDINAL IG COMPANY, Eden Prairie, MN (US)

( * ) Notice: Subject to any disclaimer, the term of this patent is extended or adjusted under 35 U.S.C. 154(b) by 280 days.

(21) Appl. No.: 17/387,500

(22) Filed: Jul. 28, 2021

(65) Prior Publication Data
US 2023/0032065 A1 Feb. 2, 2023

(51) Int. Cl.
*B29C 63/00* (2006.01)
*B29L 31/00* (2006.01)
*B65H 29/56* (2006.01)
*E06B 3/66* (2006.01)

(52) U.S. Cl.
CPC ......... *B29C 63/0013* (2013.01); *B65H 29/56* (2013.01); *E06B 3/66* (2013.01); *B29L 2031/7782* (2013.01); *B65H 2301/51122* (2013.01)

(58) Field of Classification Search
CPC ............... B29C 63/0013; B65H 29/56; B65H 2301/51122; E06B 3/66; B29L 2031/7782; Y02A 30/249; B26D 3/282; B26D 7/01; B26D 7/0625; B26D 7/1836; B26D 7/1854; B26D 11/00; B26D 1/185; B26D 1/60; B26D 2007/206
See application file for complete search history.

(56) References Cited

U.S. PATENT DOCUMENTS

| 4,087,312 A | 5/1978 | Maltese |
| 5,020,288 A | 6/1991 | Swensen |
| 5,599,422 A | 2/1997 | Adams, Jr. et al. |
| 6,793,971 B2 | 9/2004 | Trpkovski |
| 6,973,759 B2 | 12/2005 | Trpkovski |
| 7,025,880 B2 | 4/2006 | Lamb |
| 7,026,571 B2 | 4/2006 | Larsen |
| 7,083,699 B2 | 8/2006 | Trpkovski |
| 7,165,591 B2 | 1/2007 | Trpkovski |
| 9,186,876 B1 | 11/2015 | Queck et al. |

(Continued)

FOREIGN PATENT DOCUMENTS

| CN | 203513501 U | 4/2014 |
| CN | 104647443 A | 5/2015 |

(Continued)

OTHER PUBLICATIONS

European Search Report dated Jan. 3, 2023 for European Patent Application No. 22187568.5, 6 pages.

*Primary Examiner* — Alex B Efta
*Assistant Examiner* — Alexander S Wright
(74) *Attorney, Agent, or Firm* — Fredrikson & Byron, P.A.

(57) ABSTRACT

Machines are provided for removing masking from regions of glazing panes. Also provided are methods of removing masking from regions of glazing panes. The machines can include a head assembly and a processing station. The head assembly can have various combinations and/or configurations of features, including one or more of a plurality of cutters, a plurality of belts, and at least one pressurized gas nozzle.

29 Claims, 14 Drawing Sheets

(56) References Cited

U.S. PATENT DOCUMENTS

| | | | |
|---|---|---|---|
| 9,849,659 | B2 | 12/2017 | Queck et al. |
| 2003/0041533 | A1 | 3/2003 | Trpkovski |
| 2003/0213187 | A1 | 11/2003 | Trpkovski |
| 2009/0255627 | A1 | 10/2009 | Queck et al. |
| 2010/0210186 | A1 | 8/2010 | Panuska et al. |
| 2016/0361912 | A1 | 12/2016 | Queck et al. |

FOREIGN PATENT DOCUMENTS

| | | | |
|---|---|---|---|
| DE | 3435143 | A1 | 6/1986 |
| EP | 695623 | A2 | 2/1996 |

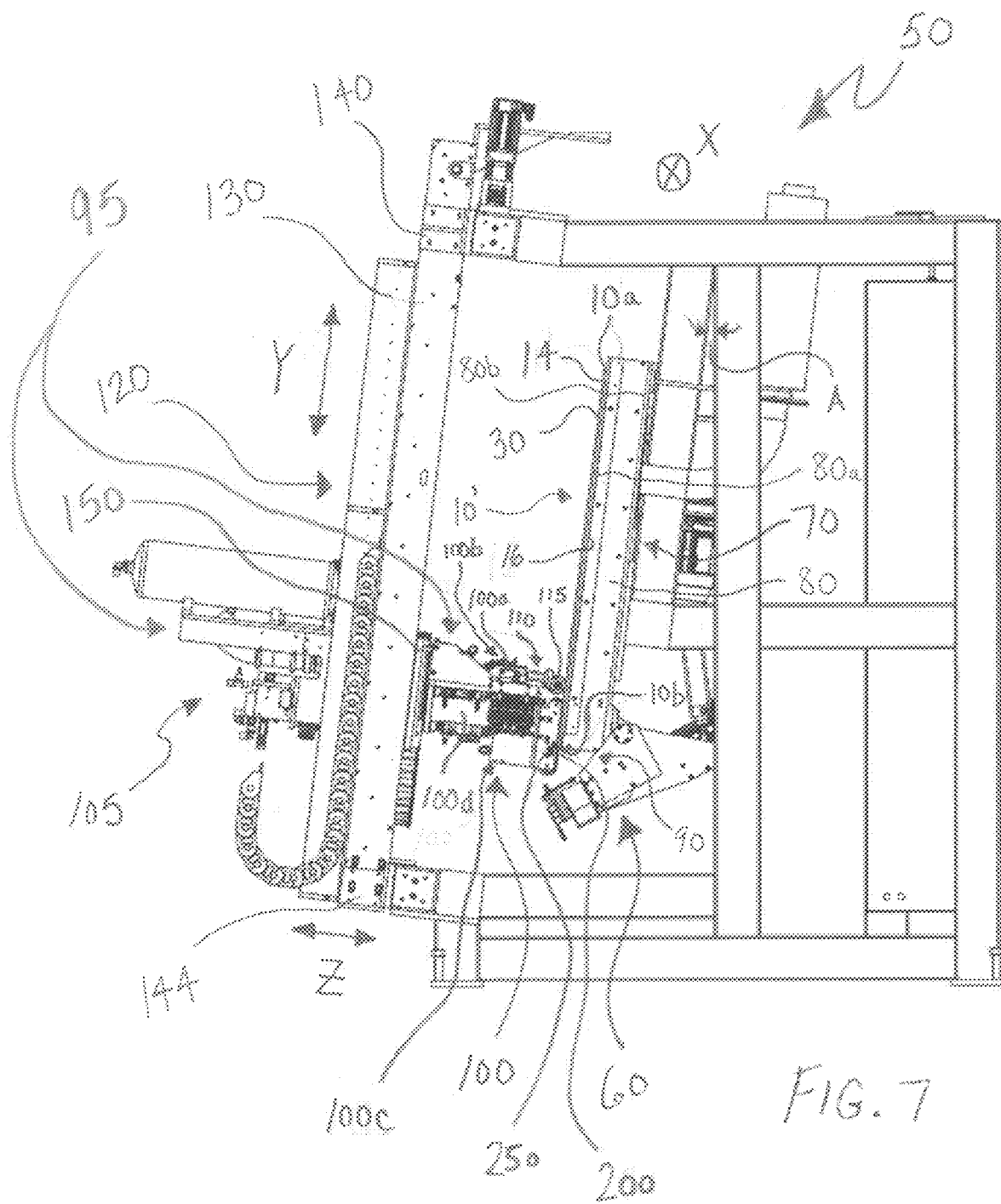

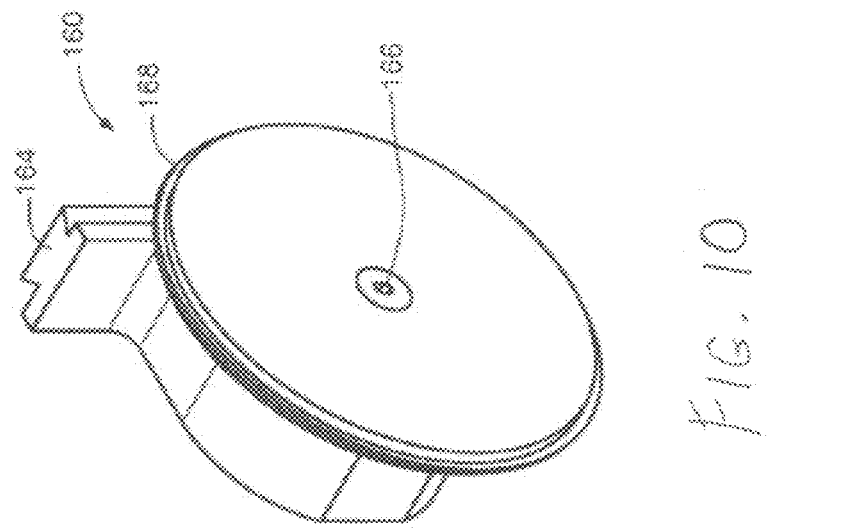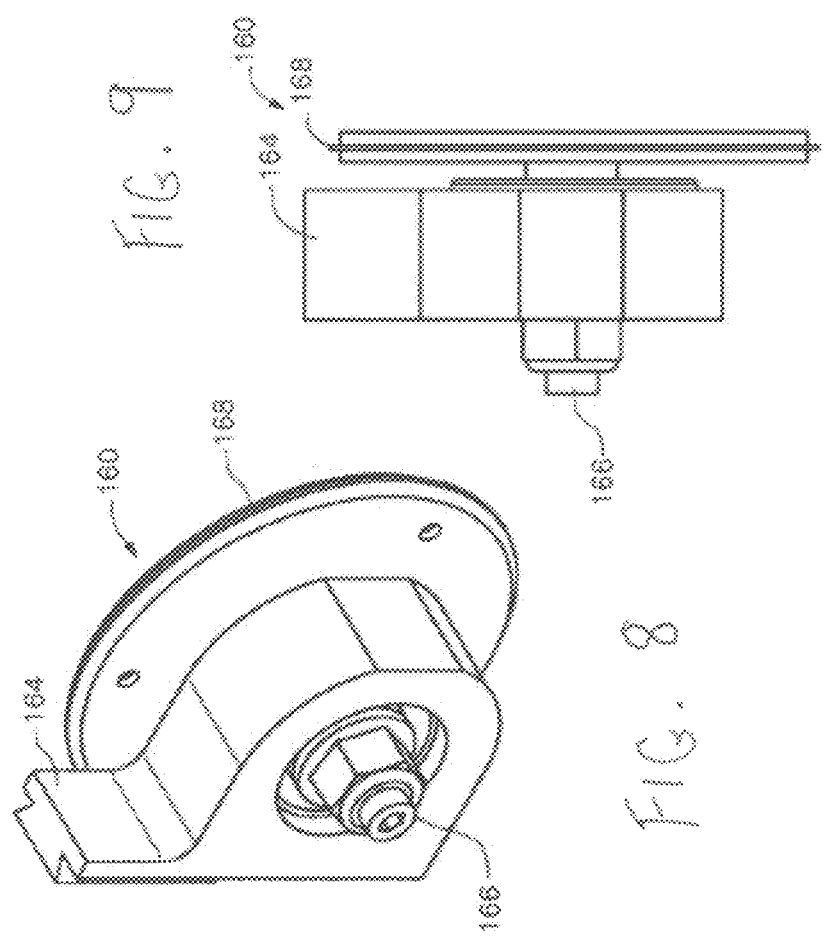

MASKING REMOVAL MACHINES, AND METHODS OF MASKING REMOVAL

TECHNICAL FIELD

The present invention relates to removing masking from masked glazing panes. In particular, the invention relates to machines for removing masking from such panes, and methods of such masking removal.

BACKGROUND

In most industrialized countries, windows touch people's lives every day. Wherever people work and live, there are windows. Windows allow the occupants of a building to view the outside world, while allowing sunlight to enter the interior of the building. Sunlight is a natural antidepressant and helps the human body produce vitamin D. Thus, a certain amount of sunshine can be essential to mental and physical well-being.

In many climates, significant energy may be lost through windows during the winter when a building is being heated, during the summer when a building is being cooled, or both. Given the high cost of energy, efforts have been made to provide homes and other buildings with insulation that will more efficiently prevent undesired transfer of heat between the inside and the outside of a building. Multiple-pane insulating glass units ("IGUs") have been developed as an effective way to reduce the amount of heat transfer through windows.

There are basically two types of multiple-pane IGUs in widespread commercial production. These are often referred to as double glazing and triple glazing. Double-glazed insulating glass units are the most common. They have a space sealed between two panes. This space provides thermal insulation. The insulating effect can be enhanced by filling the space with an insulative gas mix, e.g., a mix of air and argon or krypton. Alternatively, the space can be evacuated, thereby providing a vacuum IG unit. Compared with a single pane glazing, double-glazed IGUs can reduce the heat loss through a window by nearly half. Triple-glazed IGUs (or "triple glazings") can provide even more insulating effect, but they have historically been less common. Such units have three panes and two thermal insulation spaces.

Because of the dramatic energy savings that can be achieved with multiple-pane IGUs, building codes in many areas have been revised to require their use. The relative energy performance of these units is an important factor to consider when consumers purchase windows.

The front and rear surfaces of an IGU may be damaged (e.g., scratched) or soiled during storage, handling, and/or transportation to a building site, and/or during the building process (e.g., during installation of the IGU, or during various finishing operations, such as painting, brick washing, etc.). It is therefore desirable to provide removable masking over one, or both, of the front and rear surfaces of an IGU. Once an IGU has been mounted in its final position and all finishing of the surrounding structures has been completed, the masking can be removed from the IGU to reveal the pristine underlying pane surface.

As is known, many IGUs are provided with decorative features that enhance their aesthetic appeal and adapt them to fit within the architectural style of the building in which they are installed. Muntin bars, sometimes referred to as grille bars, are an example of such a feature. These bars can be arranged in a pattern to provide simulated divided glazing panes. The bars can be included within the interior space of an IGU, and/or applied to one or both of its exterior surfaces.

It would be desirable to provide machines for removing masking and methods of masking removal, offering improvements over, or solving one or more problems with, present machines and methods. It is sometimes desirable, for example, to remove masking film from portions of a masked glazing pane while leaving the masking film on other portions of the pane. Embodiments described herein are concerned with such masking removal and related aspects thereof.

SUMMARY

General embodiments of the invention include a machine for automated removal of masking film from masked glazing panes. The machine includes a head assembly. The head assembly includes a cutting unit, which can be movable in various directions across a masked glazing pane and has cutters to cut portions from the masking film. One application for the head assembly is to cut and remove portions of the masking film from a glazing pane in a pattern configured to accept muntin bars. After processing the masked glazing pane using the machine, muntin bars can be applied to (and in some method embodiments, are subsequently applied to) the glazing pane in alignment with the cut-out portions, e.g., such that the muntin bars do not contact the masking material remaining on the glazing pane.

In a first group of embodiments, an automated masking removal machine is provided which includes a head assembly and a processing station. The processing station is constructed to retain a glazing pane in a processing position wherein a masked surface of the glazing pane is adjacent to (e.g., oriented toward) the head assembly. The head assembly has a cutting unit that includes two spaced-apart cutters constructed to engage and move along the masked surface of the glazing pane so as to make two respective cuts in a masking film of the masked surface of the glazing pane and thereby cut a portion from the masking film. The head assembly further includes two spaced-apart belts constructed to engage and move along the masked surface of the glazing pane.

In a second group of embodiments, an automated masking removal machine is provided which includes a head assembly and a processing station. The processing station is constructed to retain a glazing pane in a processing position wherein a masked surface of the glazing pane is adjacent to (e.g., oriented toward) the head assembly. The head assembly has a cutting unit that includes two spaced-apart cutters constructed to engage and move along the masked surface of the glazing pane so as to make two respective cuts in a masking film of the masked surface of the glazing pane and thereby cut a portion from the masking film. The head assembly further includes a plurality of (preferably three or more, such as five) nozzles positioned to deliver one or more pressurized gas streams toward the portion cut from the masking film.

In a third group of embodiments, an automated masking removal machine is provided which includes a head assembly and a processing station. The processing station is constructed to retain a glazing pane in a processing position wherein a masked surface of the glazing pane is adjacent to (e.g., oriented toward) the head assembly. The head assembly has a cutting unit that includes three spaced-apart cutters constructed to engage and move along the masked surface of the glazing pane so as to make three respective cuts in a masking film of the masked surface of the glazing pane and thereby cut a portion from the masking film.

In some preferred embodiments, the automated masking removal machine includes the features of both the above-noted first and second embodiment groups. In these embodiments, the machine can optionally further include the features of the above-noted third amendment group.

Further, certain preferred embodiments of the invention provide the automated masking removal machine with the features of both the above-noted first and third embodiment groups. In these preferred embodiments, the nozzles of the above-noted second embodiment group can either be present or omitted.

In certain preferred embodiments, the automated masking removal machine includes the features of both the above-noted second and third embodiment groups. In these preferred embodiments, the belts of the above-noted first embodiment group can either be present or omitted.

BRIEF DESCRIPTIONS OF THE DRAWINGS

FIG. 7 is a further side view of the machine of FIG. 5 in accordance with certain embodiments of the invention.

FIG. 8 is a perspective view of a cutting wheel in accordance with certain embodiments of the invention.

FIG. 9 is a front view of the cutting wheel of FIG. 8.

FIG. 10 is a further perspective view of the cutting wheel of FIG. 8.

DETAILED DESCRIPTION

Figure 1:
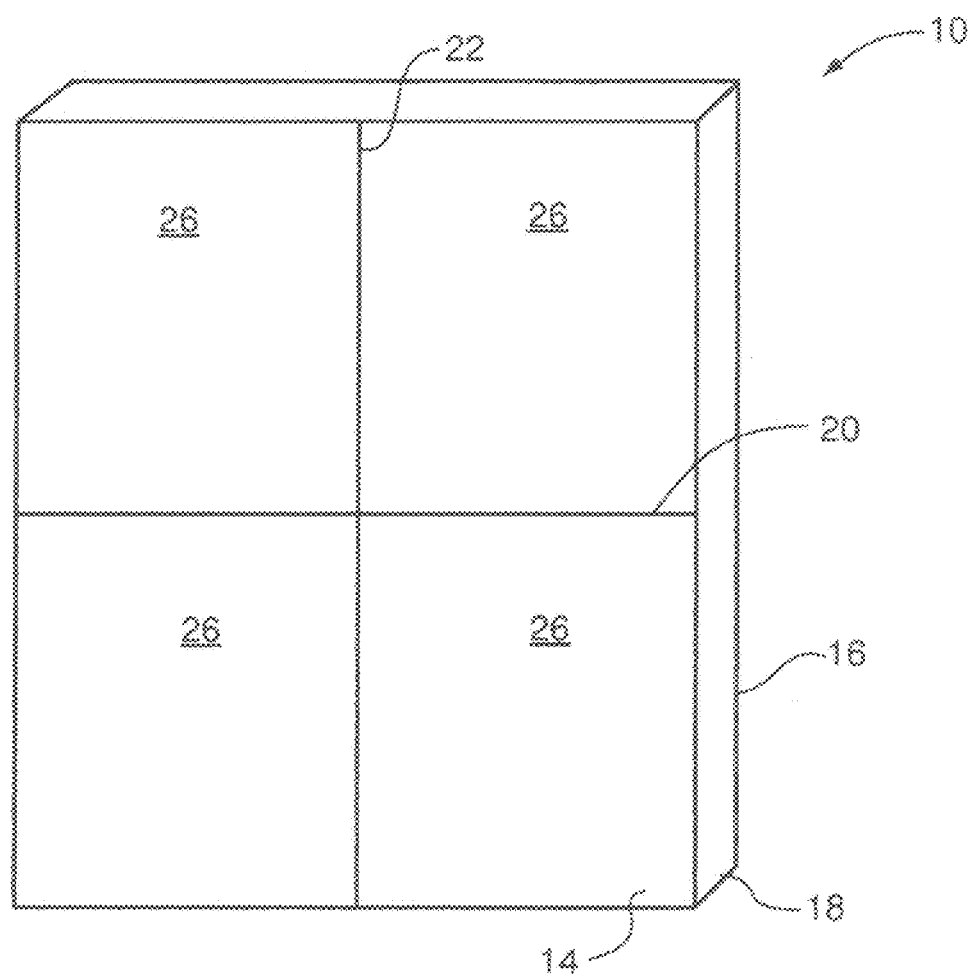
FIG. 1 is a perspective schematic view of a masked glazing pane with muntin bars in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Some embodiments of the present invention are directed to a machine configured to perform automated removal of portions of masking material (e.g., masking film) from a glazing pane having at least one surface carrying such masking (for protection of some or all of the at least one surface). A schematic representation of a glazing pane 10 is provided in FIG. 1. As shown, the glazing pane 10 can be a monolithic pane or a multi-pane insulating glazing unit (e.g., a double or triple glazed IGU). The glazing pane 10 will typically include one or more glass panes, although polycarbonate and other polymers may be used instead of glass. Panes of various thicknesses can be used in (or as) the glazing pane 10. Generally, the glazing pane 10 will include a first surface 14 and a second surface 16, which surfaces (and two panes defining them) may be located on opposite sides of a spacer (schematically identified by reference number 18), with each of the surfaces (optionally formed of glass) defined by a pane. The (or each) pane may have a thickness of from 1 mm to 12 mm. In some cases, the pane or panes each have a thickness of from 2 mm to 5 mm, such as from 2.3 mm to 4.8 mm, or from 2.5 mm to 4.8 mm. In one example, a sheet of glass (e.g., soda-lime glass) having a thickness of about 3 mm can be used. Each sheet can have a substantially rectangular form. If desired, the glazing pane 10 can comprise one or more polymer sheets (e.g., formed of clear polycarbonate or another transparent polymer sheet). The surfaces may carry one or more coatings, such as a low-emissivity coating, a solar control coating, photocatalytic coating, or a hydrophilic coating. When the glazing pane 10 is an IGU, two or more coatings can optionally be provided on the IGU. Further, in preferred embodiments where the glazing pane 10 is an IGU, the space(s) between the panes can optionally be filled with a mix of air and inert gas, such as argon. Another option is to evacuate the space(s) between the panes of such an IGU. In such cases, the glazing pane 10 can be a vacuum-IGU.

As shown, the glazing pane 10 of FIG. 1 includes muntin bars 20, 22 (depicted schematically), which are arranged in a pattern to simulate a plurality of glazing panes (e.g., to delineate a series of glazing pane areas) 26. In the non-limiting example of FIG. 1, the bars 20, 22 are applied to an exterior, first surface 14 of the glazing pane 10 and are arranged in an intersecting (e.g., grid-like) pattern to form a repeating series (e.g., a matrix) of pane areas across the surface. The bars 20, 22 are depicted schematically in FIG. 1 as lines; however, such bars have a thickness and a depth, as is conventional and well known to skilled artisans. For example, the bars can have a thickness of between about 0.5 inch and about 2 inches (e.g., less than about 1⅝ inches).

In the non-limiting example of FIG. 1, a single horizontal bar 20 and a single vertical bar 22 can be used, such that the glazing pane is divided into four simulated glazing panes (e.g., four glazing pane areas) 26. Additional bars can be provided to further simulate any desired number of divided glazing panes. For example, two horizontal bars and two vertical bars can be provided such that the glazing pane is divided into nine simulated glazing panes (e.g., nine glazing pane areas). As another example, three horizontal bars and three vertical bars could be provided such that the glazing pane is divided into sixteen simulated glazing panes. The particular number and arrangement of muntin bars can be varied as desired. Other desirable types of patterns, such as a diamond (instead of rectangular) pattern, can also be provided with different lengths and/or positioning of muntin bars.

Figure 2:
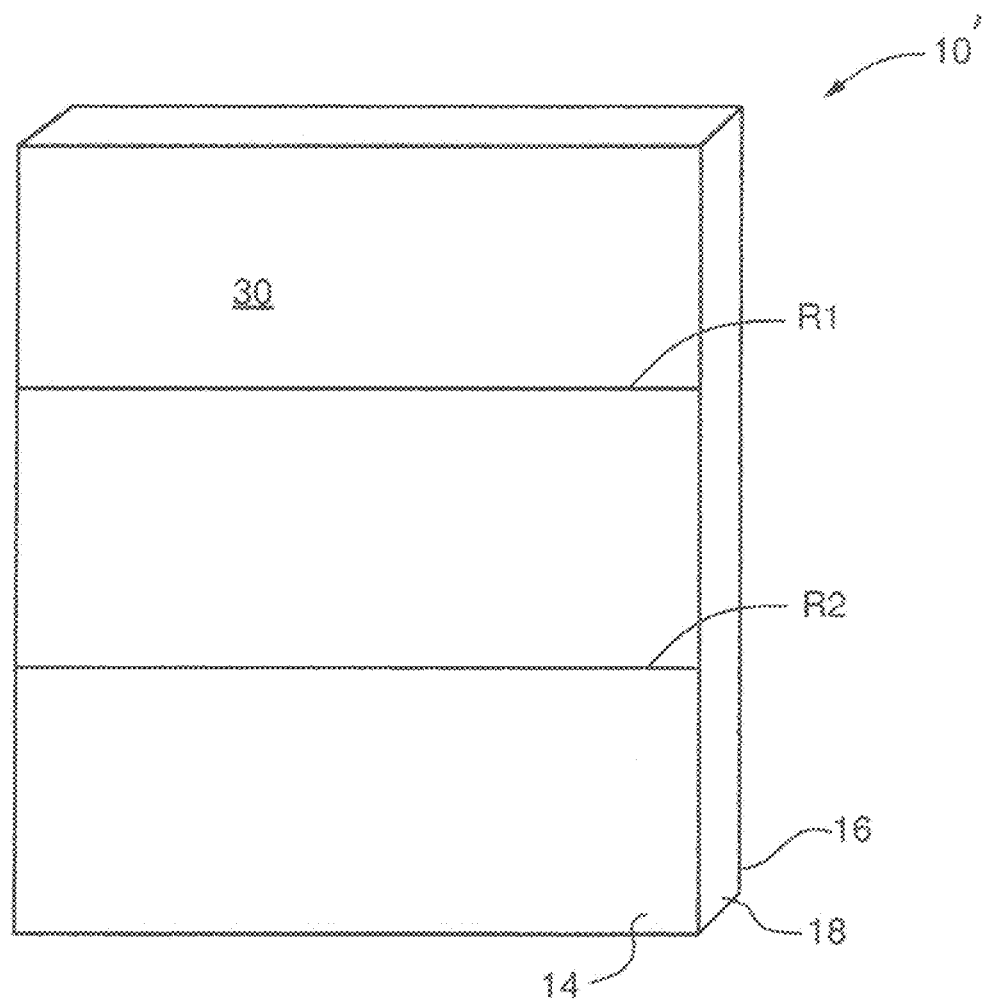
FIG. 2 is a perspective schematic view of a masked glazing pane to be processed in accordance with certain embodiments of the invention.

FIG. 2 shows a glazing pane 10' with a protective masking 30. The protective masking 30 can initially cover substantially all or a portion (e.g., a central region) of one surface of the glazing pane. For the pane 10' of FIG. 2, the masking 30 has been applied thereto prior to installation of any muntin bars, and the masking 30 is shown covering all of the first (front) surface 14. As illustrated, the masking 30 may comprise a plurality of sequentially overlapped strips of masking material. This can optionally be the case for the glazing pane 10' of FIGS. 5-7. Alternatively, a single piece of masking material may cover the entire front surface of the pane. In the example of FIG. 2, the glazing pane has been masked with three strips of masking material overlapping about two regions, R1 and R2. In some embodiments, the strips of masking material overlap by between about 0.5 and 1 inch (e.g., about 9/16 inch).

The material of the masking 30 can be of various types, including a polymeric sheet with an adhesive that adheres the polymeric sheet to the surface of the glazing pane. In some embodiments, the masking 30 comprises a polymer masking film having a pressure-sensitive adhesive on one side (i.e., on its first face, facing toward the glazing pane) and no adhesive on the opposing side (i.e., on its second face, facing away from the glazing pane). The thickness of the masking material (e.g., film) can be, for example, between about 0.0005 inch and about 0.01 inch, such as between about 0.001 inch and about 0.005 inch. In one example, the thickness of the masking film is about 0.003 inch (e.g., 0.0032 inch thick). In certain preferred embodiments, the masking film is formed of a polyethylene film (e.g., medium-density polyethylene) with a thickness of about 0.003 inch and having an acrylic adhesive on its first face. Protective film of this nature is commercially available, for example, from Poli-Film America Inc. of Hampshire, IL U.S.A. Such masking material can, for example, have a peel adhesion of between about 0.5 ounce per linear inch and about 5 ounces per linear inch (e.g., between 1 ounce per linear inch and 3 ounces per linear inch).

Figure 3:
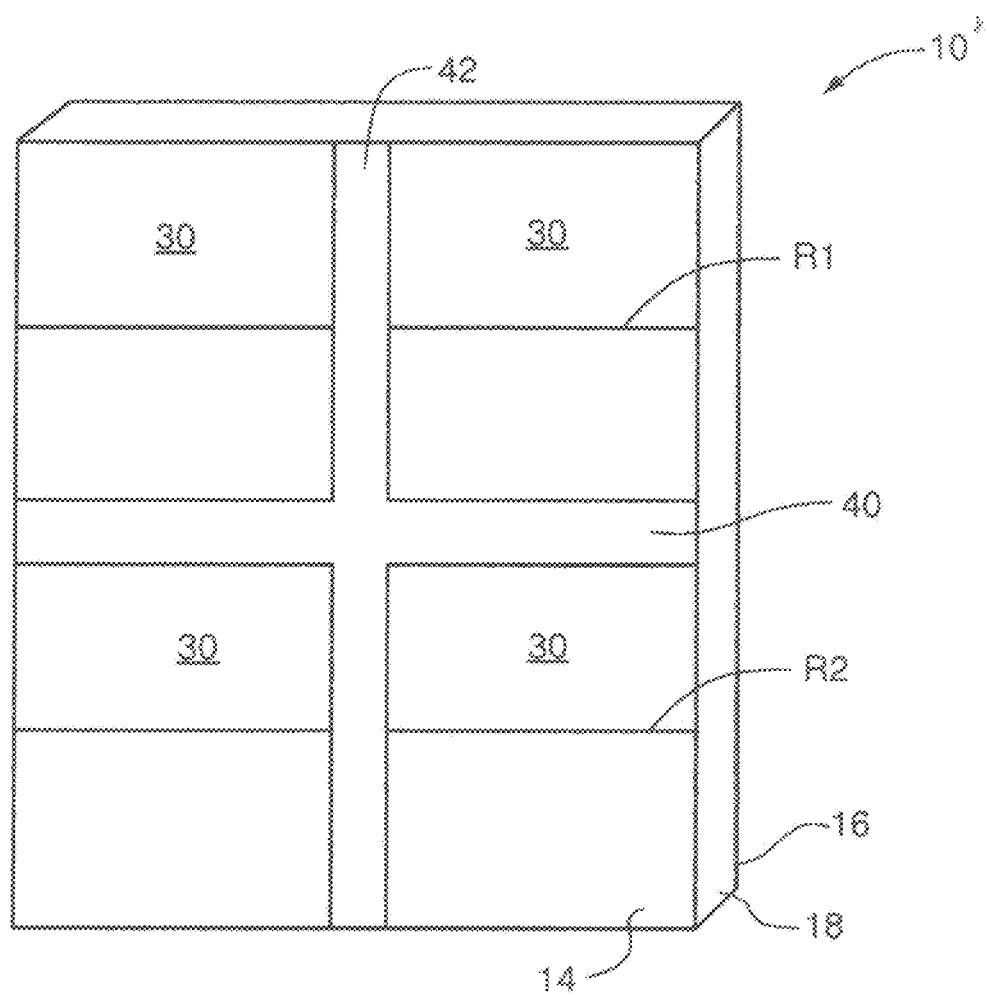
FIG. 3 is a perspective schematic view of a masked glazing pane processed in accordance with certain embodiments of the invention.

FIG. 3 shows a masked glazing pane 10 with strips of masking 30 removed (according to certain embodiments described herein) so as to form unmasked areas (e.g., unmasked strips) 40, 42 on the first surface 14. In this example, the unmasked areas (e.g., unmasked strips) 40, 42 are arranged in an intersecting pattern to form a repeating rectangle pattern across the surface. As such, the masked pane 10' is prepared for having muntin bars installed on the first surface within the unmasked areas (e.g., unmasked strips) 40, 42.

Each resulting unmasked area (e.g., each unmasked strip) 40, 42 can optionally be elongated in a direction that is: (i) perpendicular (or at least substantially perpendicular) to two edges of the masked pane 10', and (ii) parallel (or at least substantially parallel) to two other edges of the masked pane.

Figure 4:
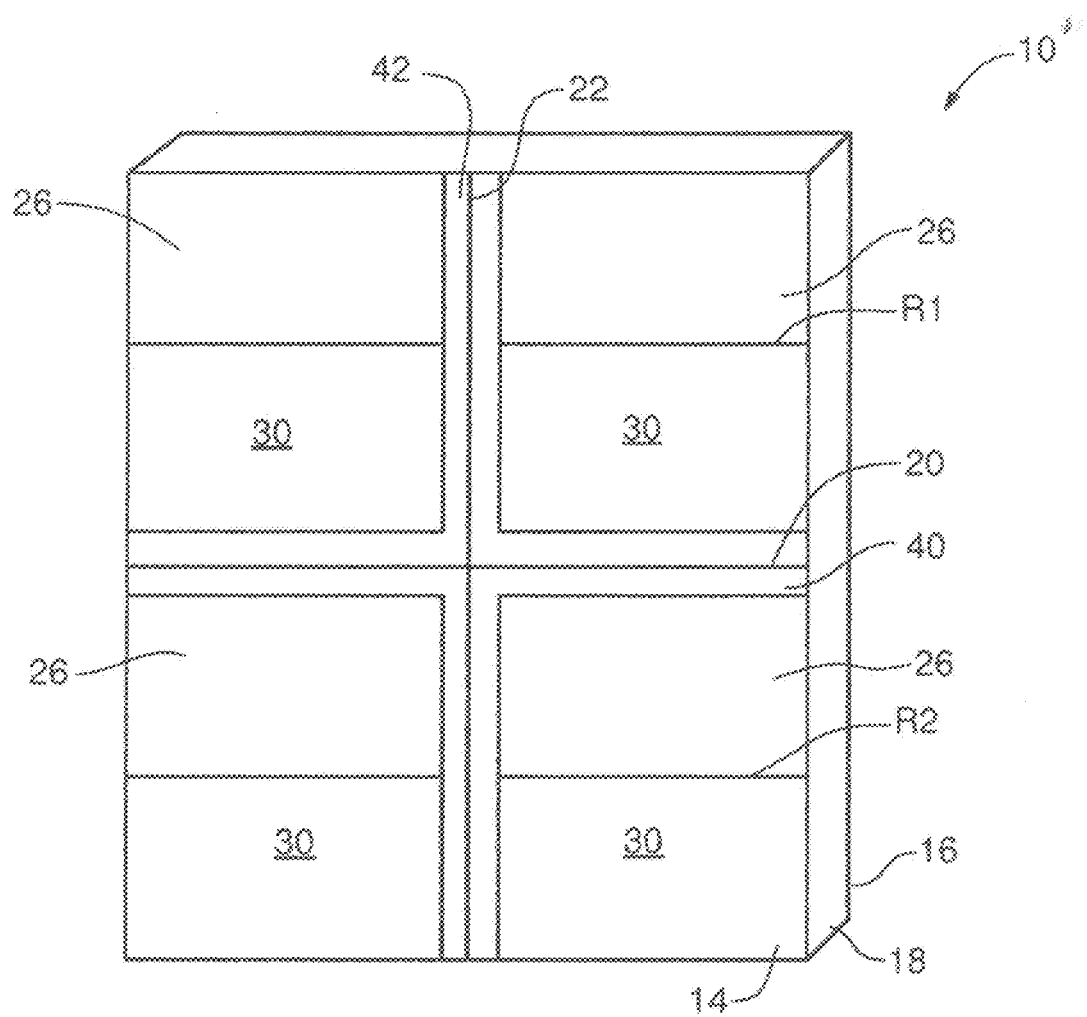
FIG. 4 is a perspective schematic view of the masked glazing pane of FIG. 3 processed and with muntin bars applied in accordance with certain embodiments of the invention.

FIG. 4 schematically illustrates the glazing pane 10' with muntin bars 20, 22 added and extending within the unmasked areas (e.g., unmasked strips) 40, 42, respectively. The illustrated muntin bars 20, 22 are aligned within the unmasked areas (e.g., unmasked strips) 40, 42 so as not to interfere with (e.g., so as not to overlap) the regions of the surface 14 of the pane 10' still having the masking 30. To that end, the regions of the surface 14 that do not receive muntin bars 22, 24 preferably retain their protective masking 30, which can ultimately be removed in normal course after the glazing pane 10' has been, for example, installed in a building wall.

Figure 5:
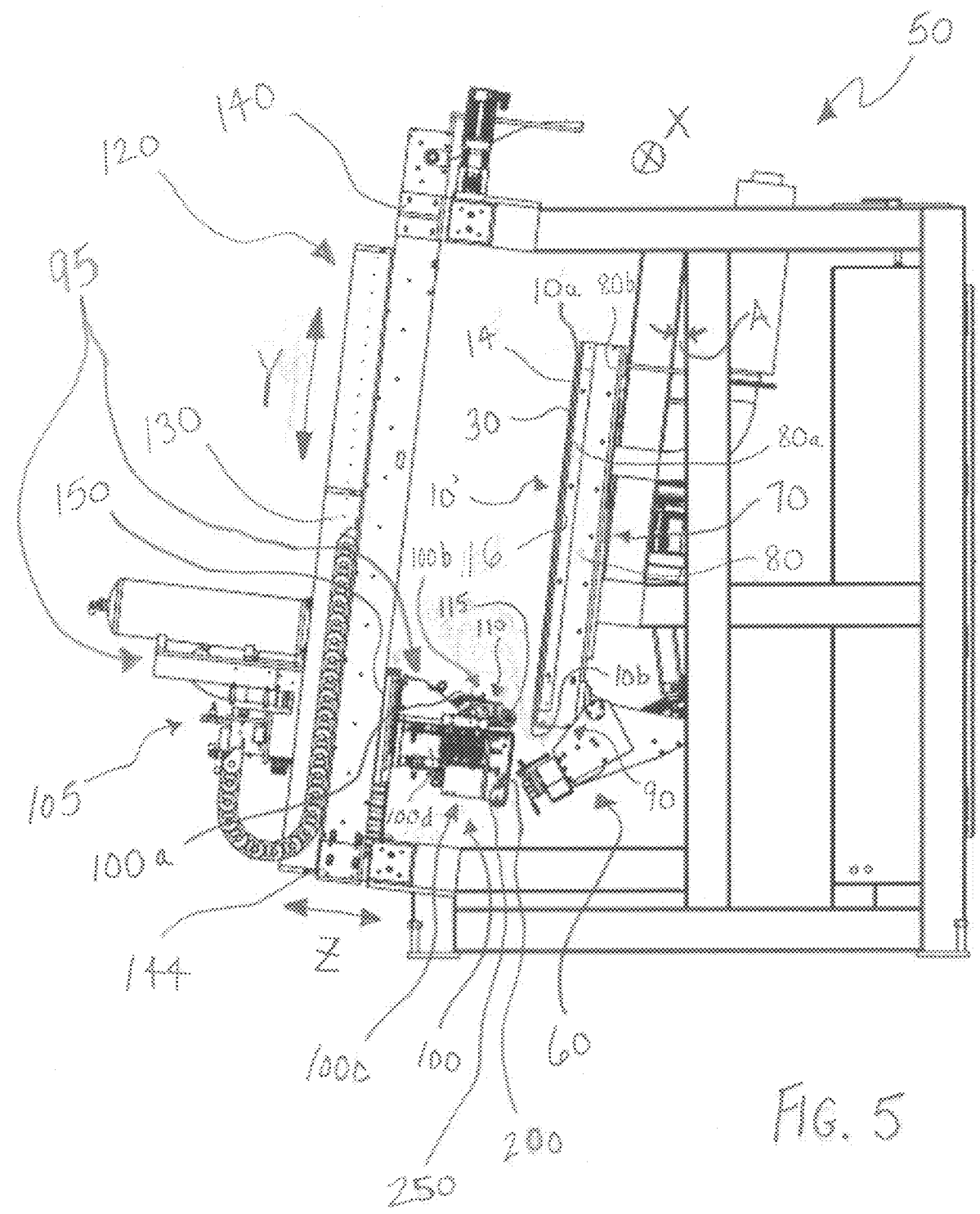
FIG. 5 is a side view of a machine configured to cut and remove strips of masking film from a masked glazing pane in accordance with certain embodiments of the invention.

FIG. 5 depicts an exemplary embodiment of a machine 50 adapted to remove masking from a masked glazing pane (exemplarily represented as pane 10' of FIG. 2). The machine 50 includes a head assembly 100 constructed to remove one or more areas (e.g., strips) of the masking 30. As will be detailed herein, the head assembly 100 can function to remove select portions of the masking 30 (e.g., one or more strips of selected width) from the pane 10', with other portions of the masking 30 being left in place. As already alluded to with reference to FIGS. 3 and 4, an exemplary application for such partial masking removal is to prepare for subsequent installation of muntin bars on the regions of the pane 10' from which portions (e.g., strips) of masking 30 are removed.

Figure 6:
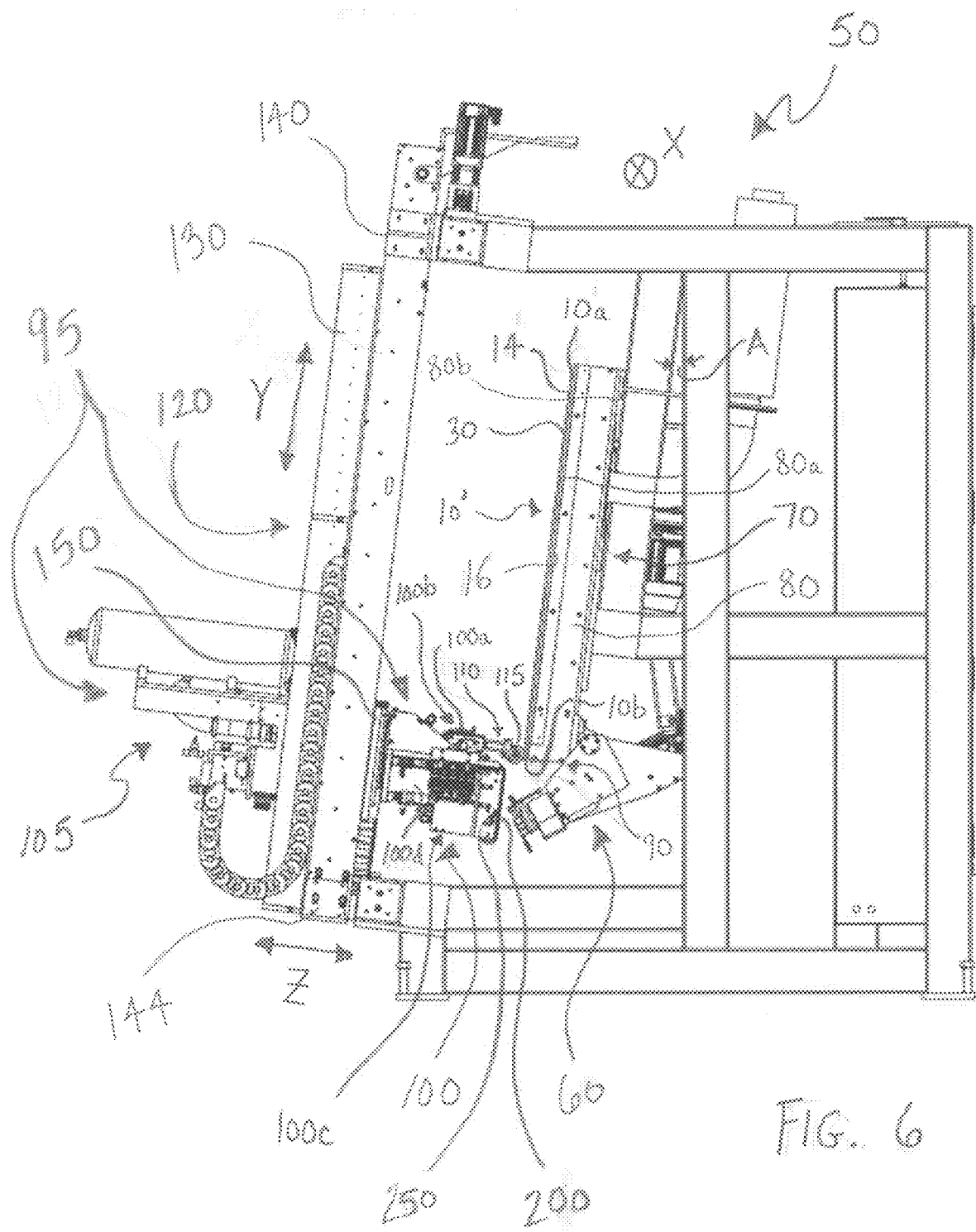
FIG. 6 is another side view of the machine of FIG. 5 in accordance with certain embodiments of the invention.
Figure 11:
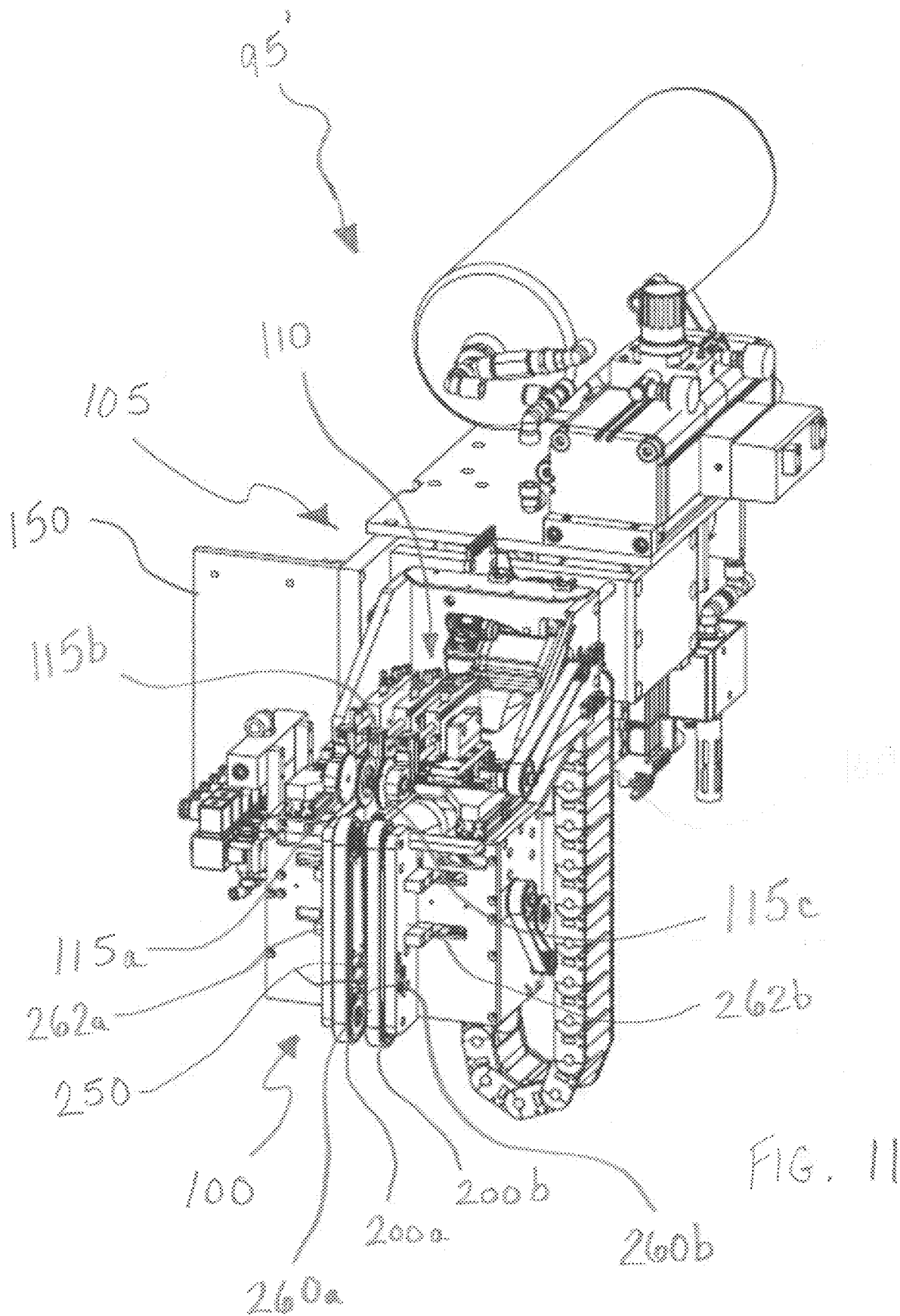
FIG. 11 is a perspective view of a masking removal mechanism of the machine of FIG. 5.
Figure 12:
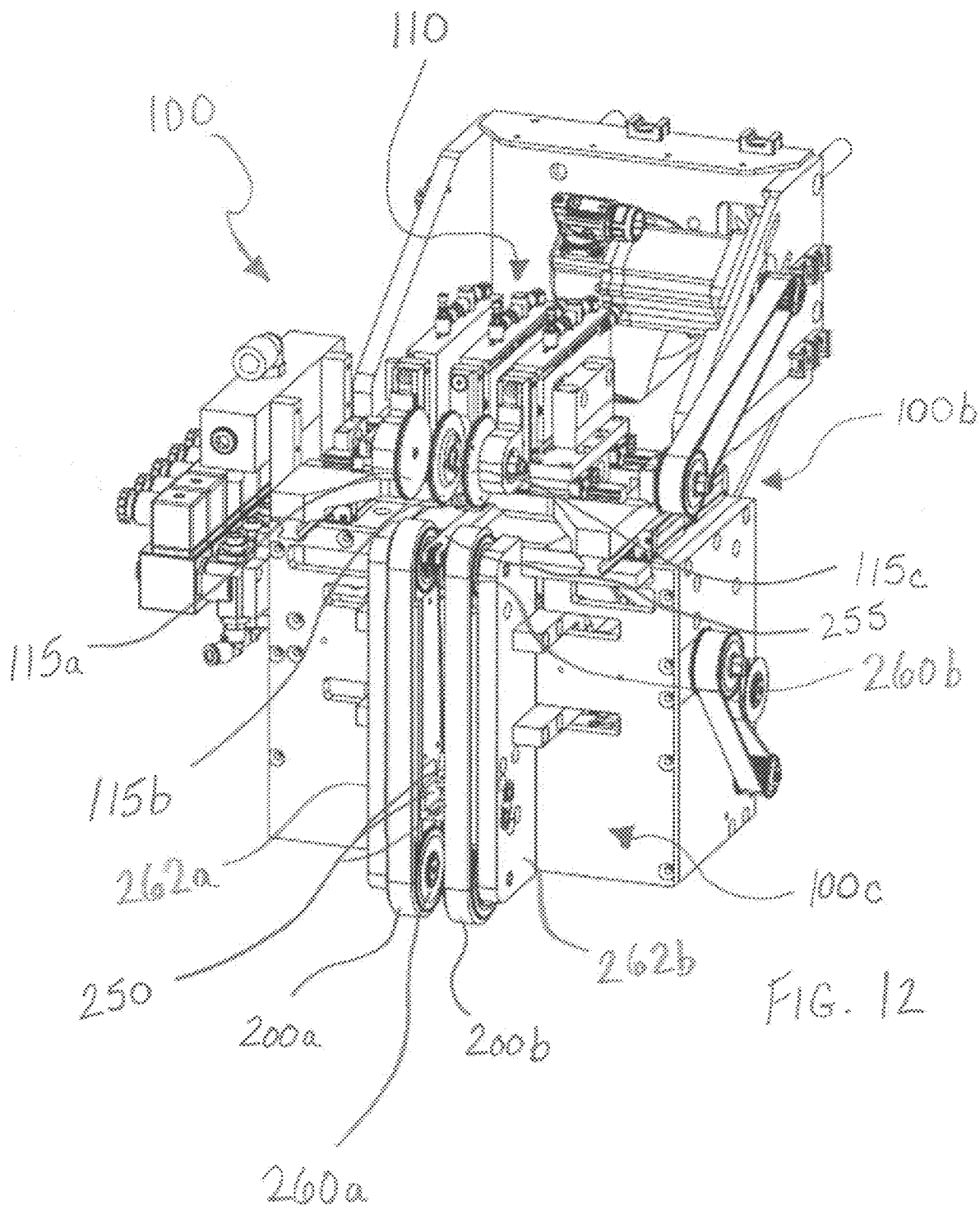
FIG. 12 is a perspective view of a head assembly of the masking removal mechanism of FIG. 11.
Figure 13:
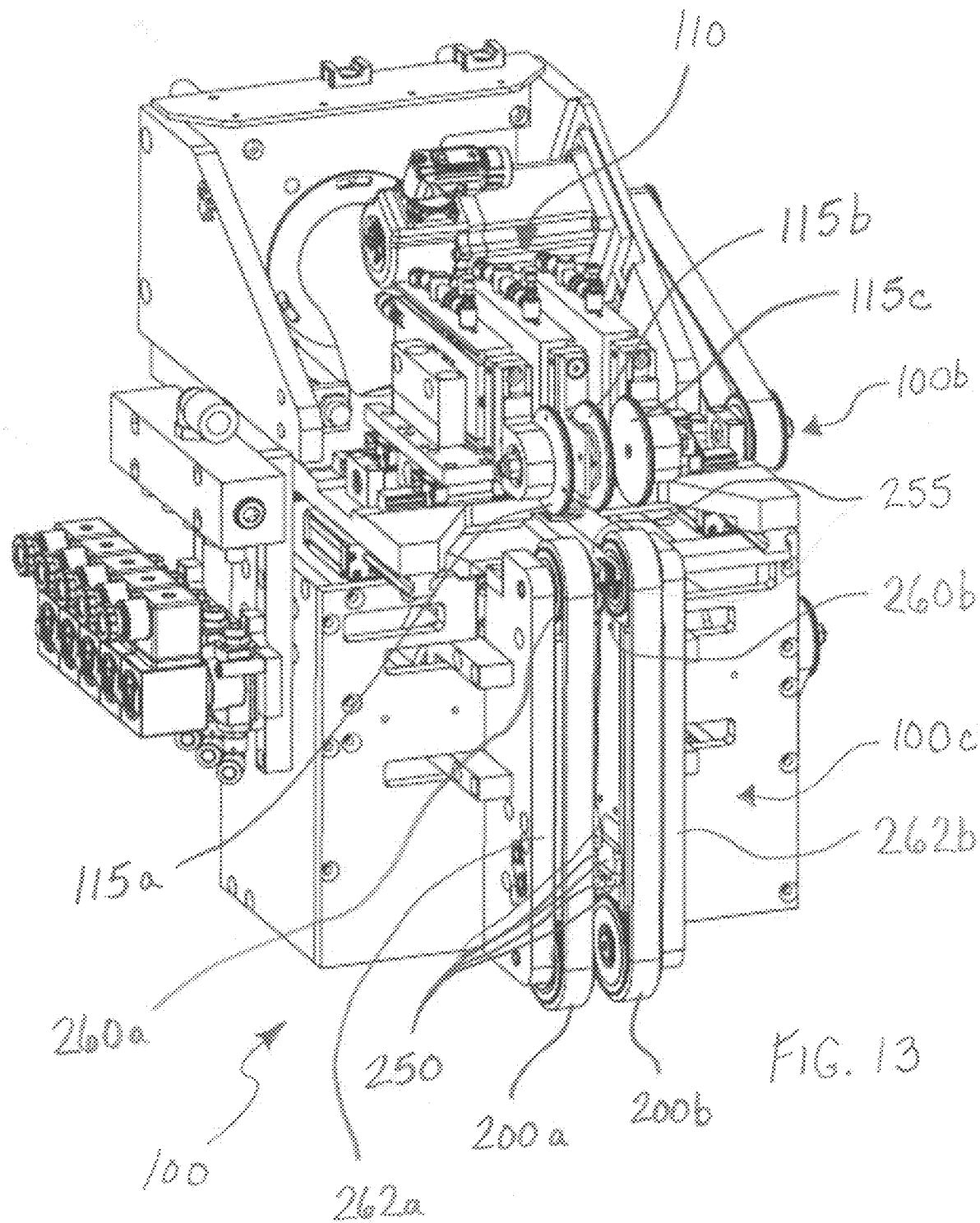
FIG. 13 is another perspective view of the head assembly of FIG. 12.

The illustrated masking removal machine 50 includes a processing station 60 constructed to receive a masked glazing pane 10' for processing. The pane 10', as shown, can be provided at the processing station 60 such that a masked front surface 14 is ready to have portions of its masking 30 removed. FIGS. 5-7 have similar representations, but for varied positioning of components of the head assembly 100 relative to the processing station 60 and the pane 10'. While the masking removal process is described herein relative to the front surface 14 of the pane 10', portions of masking 30 can additionally or alternatively be removed from the rear surface 16. In some cases, the pane has only one masked surface, and the masking removal process is thus only carried out on that one masked surface.

With further focus on FIG. 5, in certain embodiments, the processing station 60 is configured to support glazing panes in an upright (e.g., generally vertical) position while the panes are processed (i.e., while masking is being removed therefrom). To that end, the illustrated pane 10' is maintained in a vertical-offset configuration, such that the pane 10' is not perfectly vertical but rather is offset from vertical by an acute angle A. In certain embodiments, this angle A can be less than 15 degrees, and perhaps preferably less than 10 degrees. In some cases, the angle A is between 5 degrees and 10 degrees. In one example, the angle can be about 7 degrees. As shown, the angle A is offset from vertical such that the glazing pane 10' is conveyed in a "leaned back" configuration. In this configuration, a top edge 10a of the glazing pane 10' is slightly closer to the rear of the machine 50 (as measured parallel to the Z axis of the machine 50) than is a bottom edge 10b of the pane 10'.

While the illustrated processing station 60 is configured to support the panes in an upright, generally vertical position, it should be appreciated that the station can be alternately constructed for the panes to be supported in a fully vertical position, or in a horizontal or generally horizontal position.

With continued reference to FIG. 5 (and also referring to FIGS. 6 and 7), the illustrated masking removal machine 50 includes a transport system 70 for conveying the glazing pane 10'. The transport system 70 defines a path of substrate travel along which the glazing pane 10' can be conveyed. In the embodiment illustrated, the path extends parallel to an X axis of the machine 50 (with such axis shown as extending into the drawing). In certain embodiments, the path of substrate travel extends between a station inlet and a station outlet. In some configurations involving a station inlet, one or more optional conveyors can be positioned upstream, along the path of substrate travel, so as to be configured to deliver masked glazing panes (such as pane 10' of FIG. 2) from one or more masking applicator machines (not shown)

to the masking removal machine 50. Suitable masking applicator machines are disclosed in U.S. Pat. No. 9,186, 876, the teachings of which are incorporated herein by reference. In some configurations involving a station outlet, an optional conveyor can be positioned downstream, along the path of substrate travel, so as to be configured to deliver masked glazing panes with portions of masking removed therefrom (e.g., as shown on the pane 10' of FIG. 3).

The illustrated transport system 70 is adapted for moving (e.g., conveying) the masked glazing pane along the path of substrate travel while maintaining the pane in a vertical-offset configuration. In other embodiments, the transport system can be configured to move masked panes along the path of substrate travel while maintaining them in a fully vertical orientation, or in a horizontal or generally horizontal orientation.

Preferably, the transport system 70 includes a rear support 80 and a bottom conveyor 90. In embodiments of this nature, when a glazing pane 10' is conveyed along the transport system 70, the pane's rear surface 16 may be supported by (e.g., can optionally be in direct physical contact with) the rear support 80. The rear support 80 can be provided in various forms. For example, it can be formed of a platen, a framework, or both. FIG. 5 exemplifies one embodiment in which the rear support 80 includes a platen. As shown, the platen defines a front surface 80a on which the glazing pane 10' can be carried (e.g., can slide) during conveyance of the pane 10'. When provided, the platen can optionally have a flat (e.g., planar) front surface 80a with an area sufficient to accommodate glazing panes of various sizes to be processed by the machine 50.

If desired, the rear support 80 (whether involving a platen, a framework, or both) can include a plurality of rotatable bodies adapted to roll against the pane's rear surface 16 when the pane 10' is conveyed along the path of substrate travel. In certain embodiments, such rotatable bodies can be mounted in fixed positions relative to (e.g., on) the rear support 80. For example, each such rotatable body can optionally be mounted to rotate about a generally fixed axis, while at least partially protruding from, and/or being positioned forward of the front surface 80a of the rear support 80. In certain embodiments, the rotatable bodies are rotatable wheels (e.g., discs). In combination or alternatively, the rear support 80 can include a plurality of casters, which are free to rotate in any direction. Such wheels and/or casters can be provided as an arrangement (e.g., a matrix) on the rear support 80, such as being spaced vertically and horizontally from one another. When provided, the wheels are oriented so their direction of rotation corresponds to the desired direction of path of substrate travel (e.g., with such wheels being correspondingly adapted for rotation about an axis that is perpendicular to such direction).

Another option is to provide the rear support 80 with an air cushion (e.g., a plurality of air nozzles emitting pressurized air that creates such cushion) for supporting the rear surface 16 of the glazing pane 10' during conveyance. While wheels, casters, and gas nozzles are not detailed on the front surface 80a of the rear support 80 in FIG. 5 (or in FIGS. 6 and 7), these conventional devices are well known and their optional use on the rear support 80 will be readily appreciated/understood by the skilled artisan to aid in conveying/supporting the pane 10'.

In certain embodiments, the masking removal machine 50 further includes an automated sensor, configured to detect the presence of the glazing pane 10' at a position along the path of substrate travel (e.g., parallel to the X axis) of the machine 50. In such cases, the conveyor 90 is operable to move the glazing pane 10' along the path of substrate travel until the pane 10' reaches a position where a leading or trailing edge of the pane 10' is detected by the sensor. At the time of detection (and for a chosen period thereafter), the conveyor can be stopped, thereby positioning the glazing pane 10' at a desired position of the processing station 60 to facilitate removing masking 30 therefrom. In certain embodiments, the sensor is operably mounted on the platen. Additionally or alternatively, the machine 50 can include a physical stop (e.g., a bar, shoulder, or other body) that is selectively moved into the path of substrate travel, resulting in the pane 10' striking the physical stop and thereafter being held in place for processing.

The rear support 80, in certain embodiments, can include at least one suction mechanism (e.g., comprising a suction cup). In certain embodiments, the rear support (e.g., a platen thereof) has a series of suction mechanisms located along a length of the machine 50. In such cases, the suction mechanisms can each be adapted to engage the rear surface 16 of the glazing pane 10' by applying suction (e.g., a vacuum) to the surface, so as to secure the pane 10' in a stationary position while masking 30 is removed from the pane 10'. To accommodate different size glazing panes, and/or to enable glazing panes to be processed at different locations on the conveyor 90, a plurality of suction mechanisms can optionally be spaced along at least 20% (or at least 50%) of the length of the rear support or a platen thereof (as measured along the path of substrate travel of the machine 50). In certain embodiments, one or more suction mechanisms are located adjacent to the conveyor 90, e.g., on a bottom edge region of the rear support 80.

Thus, the masking removal machine 50 preferably includes a processing station 60 and a head assembly 100. The processing station 60 is constructed to retain a masked glazing pane 10' in a processing position, e.g., with a masked first surface 14 of the pane 10' being adjacent to (e.g., facing generally toward) the head assembly 100.

Preferably, the head assembly 100 includes a cutting unit 110 having a plurality of cutters 115 configured for cutting a portion (e.g., a strip of selected width) of masking 30 from the pane first surface 14. The illustrated head assembly 100 can be selectively moved in an X direction or in a Y direction (respectively parallel to corresponding X and Y axes of the machine 50). The X and Y directions, and X and Y axes, are offset from each other by an angle of 90 degrees. This is perhaps best seen by referring to FIGS. 14-16 (where the head assembly is shown with its cutters positioned for making vertical cuts). In some embodiments, the Y direction is generally vertical or vertical, and the X direction is horizontal. Preferably, the head assembly 100 can be actuated to remove vertical extending portions (e.g., vertical strips) of masking material 30 and horizontal extending portions (e.g., horizontal strips) of masking material 30 from the pane 10'. As further described below, the Y direction can be offset from vertical by the same amount (angle A) that the glazing pane 10' is held from vertical by the rear support 80 of the transport system 70.

Continuing with reference to FIGS. 5-7, the illustrated masking removal machine 50 includes a head conveyance frame 120. As shown, in certain embodiments, the head conveyance frame 120 includes a generally vertical beam 130 and two horizontal beams 140, 144. The head assembly 100 preferably is operably mounted to the head conveyance frame 120.

In certain embodiments, the head assembly 100 is operably coupled to, so as to be rotatable relative to, a support carriage 105. When provided, the support carriage 105 can be operably mounted to, so as to be movable vertically along, the vertical beam 130. In such cases, movement of the carriage 105 along the vertical beam 130 enables movement of the head assembly 100 in the Y direction relative to the pane 10', for removing vertical masking portions (e.g., one or more vertical strips of selected width).

The illustrated support carriage 105 and head assembly 100 can be collectively referred to as the masking removal mechanism 95 of the machine 50. To accommodate the same vertical-offset configuration of the rear support 80 and the masked glazing pane 10' held thereon, the vertical beam 130 can be equivalently offset from a precisely vertical orientation e.g., by the same amount of offset (angle A) to which the glazing pane 10' is held from vertical by the rear support 80 of the transport system 70. This offset angle, in certain embodiments, can be less than 15 degrees, and perhaps preferably less than 10 degrees. In some cases, the angle is between 5 degrees and 10 degrees. In one example, the angle is about 7 degrees.

In certain embodiments, the vertical beam 130 is mounted relative to, so as to be moveable horizontally along, two horizontal beams 140, 144. Such movement involves the carriage 105 moving relative to the horizontal beams 140, 144 (e.g., via movement of the vertical beam 130 along the horizontal beams), which enables movement of the head assembly 100 in the X direction relative to the pane 10' for removing horizontal masking portions (e.g., one or more horizontal strips of desired width). Thus, the head assembly 100 preferably is configured to move relative to the glazing pane 10' both between different elevation positions (e.g., for vertical cuts) and between different lateral positions (e.g., for horizontal cuts).

With continued reference to FIGS. 5-7, the illustrated head assembly 100 is operably coupled to, so as to be movable along, the vertical beam 130 of the head conveyance frame 120 via the support carriage 105. In other cases, the head assembly is mounted on a horizontal beam, which is mounted on two generally vertical beams. In such cases, the head assembly can move horizontally by moving along the horizontal beam, and the head assembly can move along a generally vertical axis when the horizontal beam moves along the two generally vertical beams. Given the present teaching as a guide, skilled artisans will be readily able to make and use various suitable gantries of this nature.

Preferably, the head assembly 100 includes a cutting unit 110. In certain embodiments, as shown in FIG. 6, the head assembly 100 further includes a linear actuator 100a, which is configured to move the cutting unit 110, and/or other components of the head assembly, parallel to the Z axis of the machine 50, e.g., toward or away from the rear support 80 and a masked glazing pane 10' positioned thereon. When provided for, such movement allows the cutting unit 110 to selectively engage and disengage with masking 30 on the glazing pane 10' for cutting the masking 30, as described herein. This can be appreciated by comparing FIGS. 5 and 6, wherein the illustrated cutting unit 110 can be moved selectively between a retracted position (see FIG. 5) and an extended position (see FIG. 6).

Thus, the cutting unit 110 of the illustrated head assembly 100 is moveable in X, Y, and Z directions. For example, via the optional linear actuator 100a, the illustrated cutting unit 110 is selectively movable toward or away from the platen or other rear support 80 of the machine 50, (e.g., in a direction parallel with the Z axis of the machine 50), in order to engage the masking 30 for cutting portions of the same from the pane 10'. Via the preferred support carriage 105 being movable along the vertical beam 130, the illustrated head assembly 100 (and correspondingly, the cutting unit 110) is moveable across the pane 10' in a generally vertical direction, e.g., parallel with the Y axis of the machine 50. Via movement of the preferred support carriage 105 relative to the horizontal beams 140, 142 (e.g., during movement of the vertical beam 130 along the beams 140, 142), the illustrated head assembly 100 (and correspondingly, the cutting unit 110) is moveable across the pane 10' in a horizontal direction, e.g., parallel with the X axis of the machine 50. It is to be appreciated, however, that movement of the head assembly in X and Y directions (or other directions, e.g., diagonally for diamond-like muntin bar patterns) can be provided through various other gantry arrangements.

Due to the preferred movement capabilities of the cutting unit 110 across the pane 10' in generally vertical and horizontal directions, the machine 50 preferably is configured to cut/remove masking portions (e.g., strips) from the pane front surface 14 in those same directions. Movement of the cutting unit 110 in generally vertical and horizontal directions enables masking material 30 to be cut/removed so as to form a grid pattern, such that muntin bars can be applied in the grid regions where masking material is removed, while masking material in other regions is left on the pane 10'.

As previously described, the head assembly 100 includes the cutting unit 110, which has a plurality of cutters 115, to cut portions of masking material 30 from the glazing pane 10'. In the embodiment depicted in FIGS. 5-7, the cutting unit 110 includes two spaced-apart cutters 115 (only one of which is visible in FIGS. 5-7). Preferably, the cutting unit 110 has three cutters 115. Reference is made to FIGS. 11-16. In other cases, the cutting unit has only two cutters. Reference is made to U.S. Pat. No. 9,849,659, the contents of which describing suitable cutting units with two cutters are incorporated herein by reference. Thus, for the embodiment shown in FIGS. 5-7 and 11-16, the cutting unit 110 can optionally have two cutters instead of three.

The cutters 115 can be of any style useful for cutting masking material. In certain embodiments, the cutters 115 are cutting wheels rotatably mounted to the cutting unit 110. In such embodiments, the cutting wheels can each have a diameter of at least about 2 inches (e.g., between about 2 inches and about 3 inches, such as about 2.3 inches), and can be spaced apart from each other between about 0.5 inch and about 3 inches (e.g., about 2 inches).

Preferably, the cutting wheels (or if there are three cutting wheels, the two outer cutting wheels) are spaced apart by a distance wider (e.g., between 1% and 10% wider) than the width of a muntin bar that is to be applied to the glazing pane in the area from where a strip of masking material is removed. Such greater spacing helps ensure that edges of the masking material do not get inadvertently pinched between the muntin bar and the pane, which could make the masking material more difficult to remove. While exemplary wheel sizes and spacings are provided, it should be appreciated that these parameters can be varied.

Three views of a cutter 115 (for cutting unit 110), embodied as a cutting wheel 160, are provided in FIGS. 8-10. As shown, the cutting wheel 160 is a circular planar member rotatably coupled to a flange 164 by an axle 166. The flange 164 is a component of the cutting unit 110. In such embodiments, each wheel 160 has a cutting edge 168 that can be moved into physical contact with the masking material 30. As the cutting unit 110 is moved relative to the masked glazing pane, the cutting wheels 160 rotate and roll across the masking material 30, making parallel cuts as they roll.

Thus, the cutting unit 110 preferably is configured to move relative to the masking material 30 and cut the masking material as just described. In certain embodiments, each cutting wheel 60 is adapted to cut through all, or substantially all, of the thickness of the masking material 30, preferably without marking the underlying pane surface (e.g., glass) to which the masking material 30 is applied. Thus, the cutting unit 110 preferably is configured and operated such that the cutting wheels 160 cut through the entire thickness of the masking material 30 and roll directly against the underlying pane (e.g., glass) surface as the cutting unit 110 is moved and the cutting wheels 160 roll. In embodiments where the masking material 30 overlaps (e.g., comprises a plurality of overlapped strips of the masking material), the cutting wheels 160 preferably are configured and operated to supply sufficient cutting pressure to entirely cut through two overlapped layers of the masking material 30. In some embodiments, the cutting pressure is between about 3 and 6 pounds (e.g., between 4 and 5.5 pounds). In certain embodiments, the cutting edge 168 of the cutting wheel 160 has a thickness of between about 0.005 inch and about 0.02 inch (e.g., between about 0.01 inch and 0.015 inch).

Regarding the exemplary design of the head assembly 100 shown in FIGS. 5-7, the cutting unit 110 includes two aligned cutters 115 (e.g., cutting wheels), and the spacing of those cutters 115 defines the width of the masking portions (e.g., strips) to be cut and removed from the masked glazing pane 10'. Accordingly, the cut portions of masking 30 preferably are cut in the shape of strips, having a relatively narrow width (defined by the spacing of the two noted cutters 115) and a desired length (based on the length of the masking 30 being cut along the pane surface, e.g., in either the X or Y direction).

In certain embodiments, the glazing pane 10' has a masking 30 comprising a plurality of sequentially overlapped strips of masking material, and each overlap has an exposed edge (e.g., defined by an edge of a strip where that strip overlaps another strip). In some of these embodiments, the exposed edges of the overlaps are parallel (or at least substantially parallel) to a first direction of movement in which the head assembly 100 is configured to move to cut one or more strips in the first direction (e.g., a horizontal or generally horizontal direction). In addition, the exposed edges of the overlaps preferably are perpendicular (or at least substantially perpendicular) to a second direction of movement in which the head assembly 100 is configured to move to cut one or more strips in the second direction (e.g., a vertical or generally vertical direction). In the present embodiments, the resulting masking 30 on the glazing pane 10' has one or more unmasked areas (e.g., unmasked strips) that are parallel (or at least substantially parallel) to the exposed edges of the overlaps, as well as one or more unmasked areas (e.g., unmasked strips) that are perpendicular (or at least substantially perpendicular) to the exposed edges of the overlaps. Reference is made to the non-limiting example of FIG. 4.

To this point, much of the description has focused on the masking removal machine 50, including its processing station 60 and head assembly 100. To that end, structures and mechanisms complementary to the head assembly 100 have been described to account for positioning of the head assembly 100 relative to the masked glazing pane 10', so that certain portions of the masking 30 can be removed efficiently and effectively. As noted above, other portions of the masking 30 are to remain on the pane 10'. It is desirable not to interfere with, damage, or otherwise adversely affect the masking 30 that is to remain on the pane 10' during the masking removal process. Thus, there has been further consideration in the design of the machine 50 and its head assembly with the goal of minimizing any effect on the masking 30 that is to remain on the pane 10', e.g., until window installation and finishing is complete.

In one group of embodiments, the head assembly 100 includes two spaced-apart belts 200 constructed to engage and move along the masked surface of the glazing pane 10'. Reference is made first to FIGS. 5-7. Here, one of the belts 200 is hidden from view, but is located behind the visible belt 200. In FIGS. 11-16, both belts 200 can be seen. In the present embodiments, the cutters 115 preferably are located on a leading portion 100b of the head assembly 100, whereas the two belts 200 are located on a trailing portion 100c of the assembly 100. Reference is made to FIG. 5. The illustrated masking removal machine 50 is constructed to move the head assembly 100 along the masked surface 14 of the glazing pane 10' with the cutters 115 ahead of the two belts 200. Thus, the two spaced-apart belts 200 are positioned to crawl along the masked surface 14 of the glazing pane 10' while trailing the cutters 115. Preferably, the two belts 200 are operable to apply pressure to the masking film 30 that will remain on the masked surface 14. This can help keep the desired masking film on the pane surface, and prevent edges adjacent to the cuts (e.g., which edges border the resulting unmasked areas/strips) from bubbling or being lifted off the surface 14. To that end, the two belts 200 preferably are spaced further apart from each other than are the cutters 115 (or, in cases where three cutters are provided, the two outer cutters). Further depiction and description relating to such spaced-apart belts 200 are provided later, with reference to FIGS. 11-16.

As noted above, the illustrated head assembly 100 is operably coupled, so as to be rotatable relative, to an optional support carriage 105. Preferably, the cutting unit 110 (via rotation of the head assembly 100) can be adjusted (rotatably) between a first configuration and a second configuration. In some embodiments, when the cutting unit 110 is in the first configuration (e.g., a first rotational configuration), shown in FIGS. 5-7, two or more spaced-apart cutters 115 of the cutting unit 110 are operable to make two or more respective cuts, elongated in the Y direction, in the masking 30 on the pane front surface 14, to thereby cut/remove a corresponding portion (e.g., vertical strip) of the masking 30. In such cases, the machine 50 preferably also includes two spaced-apart belts 200 (described above) operable to contact the remaining masking film 30 adjacent the cuts, to hold and prevent the masking 30 (that is intended to remain on the pane surface 14) from bubbling or being lifted off the surface 14. When the cutting unit 110 is in the second configuration, the two or more spaced-apart cutters 115 are operable to make two or more respective cuts, elongated in the X direction, in the masking material 30 on the pane first surface 14, to thereby cut/remove a corresponding portion (e.g., a horizontal strip) of the masking 30. Further, in the second configuration, the two spaced-apart belts 200 are operable to contact the masking 30 adjacent the cuts, to hold and prevent the masking 30 (that is intended to remain on the pane surface 14) from bubbling or being lifted off the surface 14.

Thus, it can be appreciated that the illustrated head assembly 100, and correspondingly, its cutting unit 110, cutters 115, and belts 200, are configured to rotate by 90 degrees about an axis parallel to the Z axis of the machine 50, e.g., about an axis perpendicular to the pane first surface

14. This can optionally be the case for any embodiment of the present disclosure. Reference is made to FIG. 5.

Additionally or alternatively, the cutters 115 can optionally be configured to selectively extend or retract in the Z direction (parallel to the Z axis) to selectively engage or disengage the masking material 30. This can be appreciated by comparing FIGS. 5 and 6. Preferably, the head assembly 100 includes cutters 115 and belts 200 that are configured to be separately actuated to extend or retract in the Z direction. In such cases, the cutters 115 can be moved from a retracted position to an extended position so as to engage the masking 30 on the glazing pane, and the belts can subsequently be moved from a retracted position to an extended position so as to engage the masking 30 on the glazing pane.

While the illustrated embodiment includes the preferred feature of the cutters 115 being moveable (e.g., parallel to the Z axis) between retracted and extended positions, this is not required. In other cases, the cutters simply move together with the head assembly: toward the masked glazing pane to engage cutting, away from the masked glazing pane to disengage cutting.

In a second group of embodiments, as shown in FIGS. 5-7, the head assembly 100 includes one or more pressurized gas nozzles 250 oriented to deliver one or more pressurized gas streams (e.g., air streams) toward a portion cut from (an edge region of a cut strip of) the masking 30. When provided, the one or more nozzles 250, if used in an embodiment that also includes the two spaced-apart belts 200, preferably are located between the belts. In such cases, the machine 50 is configured such that during the masking removal process and following where the cutters 115 have engaged and cut a portion (e.g., a cut strip) of masking 30 on the pane front surface 14, the two spaced-apart belts 200 crawl in the direction of the cutting while pressing the masking 30 that is located outside of the cut portion against the underlying pane surface, and at the same time the one or more nozzles 250 deliver gas stream(s) to promote disengagement of the cut portion of masking 30 from the glazing pane 10'. Thus, while the belts 200 are preventing the adjacent edges of the masking 30 from bubbling or lifting off the pane surface 14, the gas stream(s) from the one or more nozzles 250 are positioned so that the cut portion lifts and disengages from the adjacent edges. In embodiments of this nature, there can optionally be three cutters 15, such that three respective cuts (e.g., three parallel cuts) are made in the masking material 30. This may facilitate the nozzle(s) 250 lifting the cut masking strips off the underlying pane surface. In other embodiments, however, there are only two cutters.

While some embodiments only have a single nozzle, other embodiments involve multiple nozzles 250. Thus, the head assembly 100 may include a plurality of nozzles 250. Some embodiments have two nozzles, while others have at least three nozzles, such as four or five nozzles. As described above, the gas stream from each of the nozzles 250 is operable to promote disengagement of cut strips of masking 30 from the glazing pane 10'. In some embodiments, the nozzle(s) 250 are positioned at a skewed angle relative to the Z axis to help the gas stream act against the cut masking portion (e.g., strip) to promote its disengagement from the glazing pane 10'. Further description of the optional nozzle(s) 250 is provided later, with reference to FIGS. 11-16.

In some embodiments that include the belts 200 and two or more cutters 115, the nozzles are omitted. In such cases, for example, a vacuum may suffice for removing the cut strips of masking material. Additionally or alternatively, a mechanical picker may be used to lift the cut strips of masking material off the glass, optionally together with assistance from a vacuum. The teachings of U.S. Pat. No. 9,849,659 concerning such optional vacuum and picker systems are incorporated herein by reference.

With the above description as a backdrop for certain embodiments of the masking removal machine 50, focus is directed to FIGS. 5-7 and the operation (including the positioning and movement) of the head assembly 100 during a masking removal process. Initially, a masked glazing pane 10' is conveyed to the processing station 60 and held in a desired (e.g., generally vertical) position for processing. The head assembly 100 is then moved and operated so as to remove one or more portions (e.g., one or more strips) of masking 30 from the front surface 14 of the pane 10'. In the embodiment illustrated, an initial movement of the head assembly 100 involves moving the support carriage 105 relative to the head conveyance frame 120, e.g., until the head assembly 100 reaches a desired starting point on the glazing pane 10'. To that end, a corresponding consideration is whether a vertical or horizontal portion (e.g., strip) of masking is to be removed first. That dictates the appropriate initial position and orientation of the head assembly 100 relative to the pane 10'. More will be described herein concerning this step. At this point, however, as shown in FIG. 5, it is assumed that the head assembly 100 is initially positioned for a desired vertical cut, e.g., a cut oriented in the Y direction.

In connection with removing masking in a generally vertical direction (e.g., parallel to the Y axis), reference is made to FIG. 3, showing a vertical strip of masking material 30 having been cut and removed to create a vertical unmasked strip 42. To that end, in positioning the head assembly 100 shown in FIG. 5 relative to the front surface 14 of the glazing pane 10', the support carriage 105 can initially be moved relative to (e.g., along) the vertical beam 130 for positioning in the Y direction and/or relative to the horizontal beams 140, 142 (e.g., via corresponding movement of the vertical beam 130) for positioning in the X direction.

Once the head assembly 100 is in a desired starting position relative to the pane front surface 14, the support carriage 105 can be moved relative to (e.g., along) the vertical beam 130 to provide corresponding movement of the head assembly 100 while making the desired generally vertical cuts in the masking 30. In embodiments where no support carriage is provided, the head assembly moves in the same direction (e.g., vertically or generally vertically) relative to the masked pane surface while making the desired generally vertical cuts in the masking 30. As will be appreciated, during at least some of this movement of the head assembly, the cutters roll along the masked pane surface while cutting the masking material.

Shifting to FIG. 6, in certain embodiments, a linear actuator 100a is actuated to move the cutting unit 110 toward the rear support 80 (e.g., in the Z direction). At this stage, the cutting unit 110 may engage the masking film 30 on the glazing pane 10', or may be in position to be subsequently moved in the Y direction to engage the masking material 30 on the glazing pane 10', and thereby begin cutting a portion of the masking material 30 in such direction. Movement of the cutting unit 110 in the Y direction relative to the glazing pane 10' can be appreciated by comparing FIGS. 6 and 7.

When provided, the linear actuator 100a preferably is configured to move the cutting unit 110, or at least the cutters 115, between retracted and extended positions relative to other portions (such as the optional belts 200, the optional nozzles 250, or both) of the head assembly 100. This is best appreciated by comparing FIGS. 5 and 6.

In preferred embodiments, two belts 200 and one or more nozzles 250 are moved, either conjointly with the cutting unit 110 or after moving the cutting unit 11 into contact with the masked pane surface, toward the rear support 80 (e.g., in the Z direction) such that the belts 200 press remaining masking edges (which border the cut masking portion) against the underlying pane surface 14, while the nozzle(s) are actuated to remove the cut portion of masking film 30 from the pane surface 14.

If desired, a separate linear actuator 100*d* can be provided to move the optional belts 200, the optional nozzle(s) 250, or both in the Z direction. When provided, linear actuator 100*d* preferably is configured to move the belts 200 between retracted and extended positions. In FIG. 7, it can be appreciated that the linear actuator 100*d* has been operated to move the belts 200 into engagement with the masked surface of the glazing pane 10'. At this stage, both the cutters 115 and the belts 200 are in contact with the masked surface of the glazing pane 10'. During the masking cutting operation, both the cutters 115 and the belts 200 preferably contact the masking 30 while the head assembly 100 is moved relative to the glazing pane.

Thus, some embodiments of the masking removal machine 50 have separate linear actuators for the cutting unit 110 and the belts 200. Other embodiments use the same linear actuator for both the cutting unit and the belts. In still other embodiments, rather than having such individual linear actuators, the machine is configured to simply move the entire head assembly selectively toward or away from the masking surface of the glazing pane.

To cut a strip, the head assembly 100 is moved along the pane front surface 14 until the desired vertical portion of the masking 30 is removed. It should be appreciated that more removal of masking 30 can subsequently be performed (e.g., other vertical cuts can subsequently be made), as desired. For example, if two vertical strips of masking material are to be removed, the cutting unit 110 would be moved through two vertical cutting passes. For larger panes, three or more vertical strips may be cut, in which case the cutting unit 110 would be moved through the three vertical cutting passes.

As described above, the cut portions of masking 30 can advantageously be removed from the glazing pane 10' via one or more pressurized gas nozzles 250, optionally together with using a vacuum to suck the cut portions (e.g., strips) of masking away from the glazing pane. In embodiments involving three cutters 115, one or more pressurized gas nozzles 250 preferably are oriented to deliver a pressurized gas stream at a central cut (i.e., a cut made by the central cutter 115*b*) in the masking 30. This can advantageously make the two resulting cut-strip halves (which result from cutting with three cutters) of each cut strip to move away from each other, e.g., by being blown up, off the underlying pane surface, and away from each other.

In embodiments of this nature, the head assembly 100 can optionally also include an abrasion tool (e.g., a knurling tool) 255 that is configured to engage the central cut in the masking 30. When provided, this tool preferably is adapted to engage the central cut in the masking at a location ahead of (or at) the location where a gas stream from the pressurized nozzle(s) 250 impacts the central cut in the masking. In such cases, the abrasion tool acts on the masking at the central cut before (or at the same time that) the gas stream from the pressurized nozzle(s) 250 strikes the masking at the central cut. In embodiments of this nature, the abrasion tool 255 preferably is located closer to the cutting unit 110, closer to the leading region 100*b* of the head assembly 100, and/or further from the trailing region 100*c* than are the pressurized gas nozzle(s) 250.

Thus, some embodiments of the machine 50 use mechanical removal mechanisms. One exemplary mechanism is an abrasion tool 255 carried by the head assembly 100 (perhaps best shown in FIGS. 12 and 13). When provided, the abrasion tool 255 can be a knurling tool e.g., taking the form of a circular member rotatably mounted to the assembly 100 and having a knurling edge along its circumference. The knurling face can include a series of protruding edges along the circumference, which can be skewed relative to an axis about which the knurl tool rolls. Such a tool can optionally be positioned adjacent the cutting unit 110 (e.g., proximate to the trailing portion 100*c* of the assembly 100), and may be located between the cutters 115 (or, if three cutters are provided, between the outer two 115*a*, 115*c* of the cutters and preferably in direct downstream alignment with the central cutter 115*b*). This is perhaps best seen in FIG. 12. In such cases, the knurling face can be placed into physical contact with the cut masking portion (e.g., strip) so that as the head assembly 100 is moved along the masked pane surface, the tool will rotate and roll across the cut portion of masking 30, thereby knurling the cut masking material. In some embodiments where the head assembly 100 includes three cutters 115 and a knurling tool 255, the knurling tool is aligned with the central cutter 115*b*, such that the knurling tool is positioned to act on the masking 30 at a central cut therein (i.e., the cut made by the central cutter 115*b*).

In certain embodiments, the head assembly 100 includes three cutters 115, a knurling tool 255, and one or more pressurized gas nozzles 250. In these embodiments, the knurling tool 255 can optionally be aligned with the middle cutter 115*b*, while the pressurized gas nozzle(s) 250 are oriented to direct one or more streams of pressurized gas toward the cuts made in the masking by the cutters 115. In addition, a vacuum mechanism can optionally be provided to suck the cut masking strips away from the glazing pane and to a garbage or recycling receptacle.

Another mechanical option is a claw mechanism, which can be configured to lift a front edge region of the cut masking film away from the first surface 14 of the glazing pane. The claw can include an extending member to engage the cut strip at an edge, and may extend at a skewed angle (e.g., between about 25 and about 50 degrees) relative to the Z axis to help it engage and lift the edge of the masking material. When provided, the claw mechanism can be adjacent the cutting unit (e.g., located proximate to the trailing portion of the head assembly), and may be located between the cutters. Reference is made to U.S. Pat. No. 9,849,659, the contents of which describing suitable claw mechanisms are incorporated herein by reference.

Turning now to FIGS. 11-16, various views of the head assembly 100 are shown. Here, it can be appreciated that the head assembly 100 preferably includes a cutting unit 110 having three spaced-apart cutters 115*a*, 115*b*, 115*c*. In embodiments of this nature, the head assembly 100 is configured to make three parallel cuts in the masking film 30 on the front surface 14 of the glazing pane 10'. By providing three cutters 115, three cuts can be simultaneously made in the masking material 30 in a single pass of the cutting head 10 along the masked surface of the glazing pane 10'. Having three cuts of this nature (e.g., three parallel side-by-side-by-side cuts) may advantageously make it easier to remove the cut masking strip from the glazing pane.

Preferably, the three cutters include two adjustable cutters 115*a*, 115*c* and a fixed central cutter 115*b*. In such cases, the two adjustable cutters 115*a*, 115*c* are spaced apart by an adjustable width, and the fixed central cutter 115*b* is located (e.g., midway) between the two adjustable cutters. With two outer cutters 115*a*, 115*c* being adjustable, they can be set and used at different separation distances, so as to configure the cutter 115 to cut strips of different widths.

It is desirable for the portions of masking 30 remaining on the pane 10' not to be adversely affected by the removal process. The preferred head assembly 100 is configured to aid in this pursuit. When provided, the preferred three cutters 115*a*, 115*b*, 115*c* create three separate cuts, which facilitate easily removing a portion (e.g., a strip) of masking from the surface 14 of the masked glazing pane 10'. As noted above, the central cut helps make the cut masking portion more easily removed from the pane surface 14. Moreover, the head assembly 100 preferably includes a pair of belts 200*a*, 200*b* and/or one or more pressurized gas nozzles 250. As already explained, the optional belts 200*a*, 200*b* can be provided to help stabilize the masking 30 that remains on the pane 10' after the cutting/removal process, while the optional nozzles 250 can be provided to help remove the cut portions of masking 30 from the glazing pane 10'.

It is to be appreciated, however, that one group of embodiments includes any embodiment where the cutting unit 110 comprises three cutters 115*a*, 115*b*, 115*c*, whether or not the machine also has belts or pressurized gas nozzles.

When provided, the two spaced-apart belts 200*a*, 200*b* preferably are continuous belts (or "tracks") rotatably mounted to the assembly 100. In some preferred embodiments of this nature, one or both of the belts 200*a*, 200*b* are movable toward or away from each other, so as to adjust the spacing (or separation distance) between them. This can be appreciated by comparing FIGS. 14, 15, and 16. Thus, the illustrated belts 200*a*, 200*b* are adjustable between different operable configurations in which they are separated by different distances. This can be advantageous for accommodating use of the machine to cut masking strips of different widths.

For embodiments in which belts 200*a*, 220*b* are provided, the belts (e.g., outer track surfaces thereof) preferably each contact the masking 30 during at least part of the cutting operation.

With continued reference to FIGS. 11-16, the illustrated belts 200*a*, 200*b* are each mounted on a pair of rotatable sprockets 260*a*, 260*b*. Here, the two belts 200*a*, 200*b* are constructed to respectively circulate on the two pairs of rotatable sprockets 260*a*, 260*b*. This is perhaps best shown in FIGS. 12 and 13. The two illustrated pairs of rotatable sprockets 260*a*, 260*b* are mounted respectively on two adjustable bases 262*a*, 262*b*. Each of the illustrated bases comprises a wall to which two of the sprockets are mounted. The bases 262*a*, 262*b* preferably are mounted on (or adjacent) a front wall of the head assembly 100. When provided, the bases 262*a*, 262*b* preferably are configured to be selectively movable toward and away from each other. Both illustrated pairs of rotatable sprockets 260*a*, 260*b* (and belts 200*a*, 200*b*) are situated between the bases 262*a*, 262*b*. This, however, is not required. By moving one or both of the bases 262*a*, 262*b* toward or away from each other, the spacing between the belts 200*a*, 200*b* can be adjusted to correspond with (e.g., be slightly greater than) the width of the masking portion to be removed from the masked glazing pane 10'.

Thus, in one group of embodiments, the machine 50 includes two belts 200*a*, 200*b* of the nature described above. In these embodiments, the cutting unit 110 can have two or three cutters 115. In addition, the machine 50 in the present group of embodiments can optionally include a plurality of pressurized gas nozzles. It is to be appreciated, however, that the present group of embodiments includes any embodiment where the head assembly 100 comprises two belts 200*a*, 200*b* of the nature described above, whether or not the machine also has three cutters or any pressurized gas nozzles.

In another group of embodiments, the machine 50 includes one or more pressurized gas nozzles 250. The nozzle(s) preferably are configured to operate at a high gas pressure, are adjustable in certain respects, or both.

When provided, the number of pressurized gas nozzles 250 can be one, two, three, four, or even five or more. In certain embodiments, the head assembly 100 includes at least two nozzles 250 that are spaced apart from each other by an adjustable width. Such nozzles 250 are selectively movable closer together or further apart, whereby the width is changed. In some cases, at least one nozzle 250 is mounted on each of two optional bases 262*a*, 262*b*. In the embodiment illustrated, the spacing between the bases 262*a*, 262*b* can be changed, and doing so changes the spacing between the belts 200*a*, 200*b* and changes the width between two (or more) of the nozzles 250.

In some cases, the nozzles 250 are oriented at a skewed angle relative to the Z axis of the machine 50. In such cases, a gas stream exiting from each nozzle 250 desirably interacts with the cut masking material at a skewed angle. Preferably, at least one nozzle 250 is oriented at a different skewed angle than at least one other nozzle 250. In some cases, a first nozzle 250 (closest to the cutting unit 100) is positioned at a larger angle than a second nozzle. For example, a first nozzle can be positioned at an angle of about 30-60 degrees (e.g., 45 degrees) with respect to the pane surface 14 while a second nozzle is positioned at a different angle of about 30-60 degrees (e.g., 35 degrees) with respect to surface 14. In addition, one or more (e.g., two) of the nozzles 250 can optionally be configured to direct pressurized gas in the Z direction, e.g., perpendicular to the pane surface 14.

Figure 16:
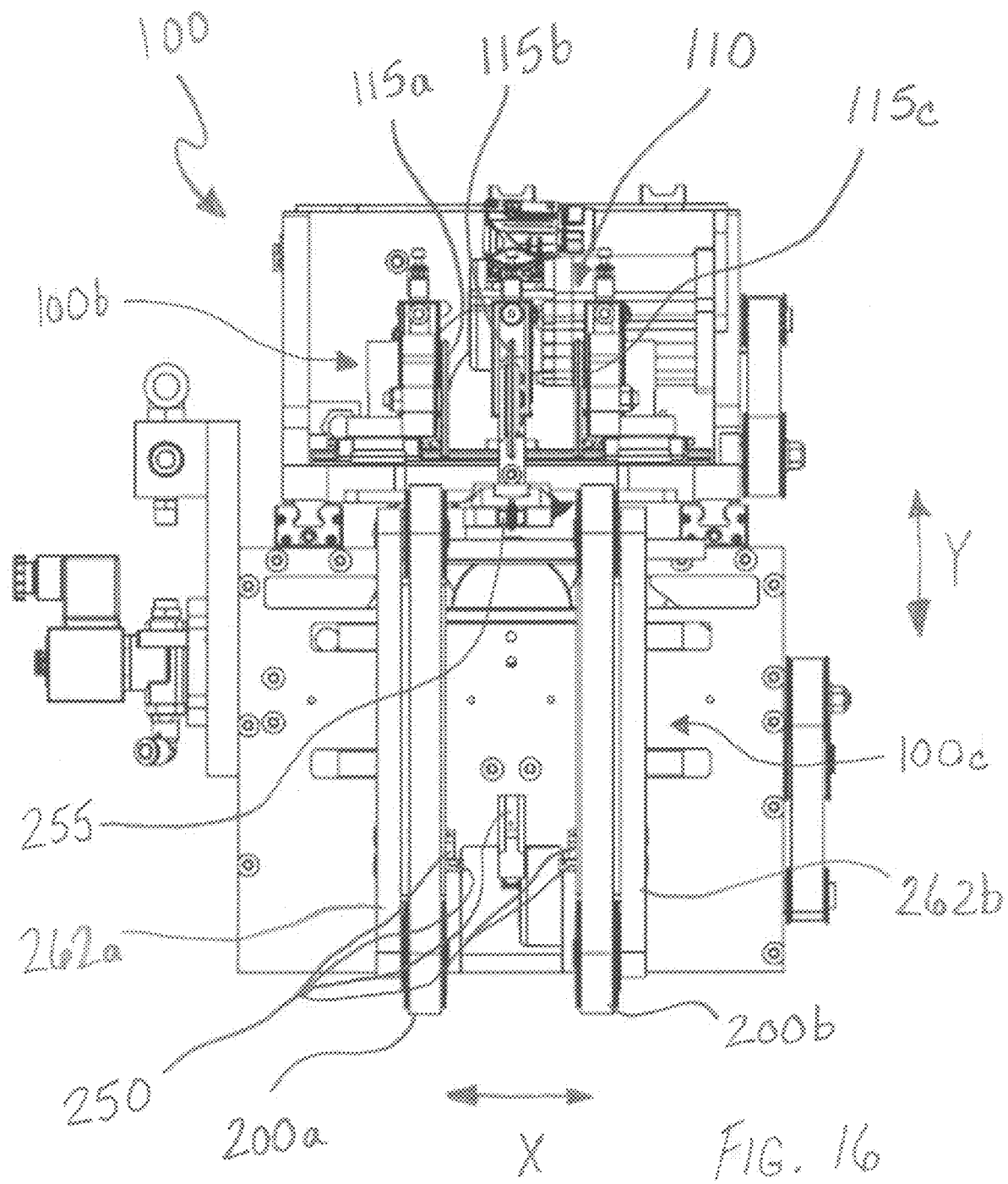
FIG. 16 is a further front view of the head assembly of FIG. 12, with the two illustrated belts adjusted so as to be separated from each other by a greater distance than in FIG. 14.

Referring to FIGS. 6 and 16, the three nozzles 250 closest to the cutting unit 110 are each oriented to direct a pressurized gas stream at an angle of about 30-60 degrees (e.g., 45 degrees) with respect the pane surface 14, whereas the two nozzles 250 furthest from the cutting unit 110 are configured to direct pressurized gas in the Z direction, e.g., perpendicular to pane surface 14. It is to be appreciated, however, that these particular angles are by no means required.

The nozzles 250 can be operated under various conditions. Preferably, the gas is air at a pressure of greater than 150 pounds per square inch (e.g., greater than 175 pounds per square inch). In some cases, the pressure is about 200 psi or more. This can optionally be the case for any embodiment involving one or more nozzles.

Thus, the cut portions of masking 30 can be removed from the glazing pane 10' via one or more pressurized gas nozzles 250. Additionally or alternatively, the head assembly can use mechanical removal mechanisms. As already described, one exemplary mechanism is an abrasion tool 255 with a knurl face carried by the head assembly. When provided, the abrasion tool 255 can be referred to as a knurling tool. This is perhaps best shown in FIG. 12. Here, the embodiment illustrated includes three cutters 200*a*, 200*b*, 200*c* located on a leading portion 100*b* of the head assembly 100 and the abrasion tool 255 is located on a trailing portion 100*c* of the assembly 100. In embodiments of this nature, the head assembly 100 is configured to move along the masked surface 14 of the glazing pane 10' with the three cutters 200*a*, 200*b*, 200*c* ahead of the knurling tool.

Thus, in the present group of embodiments, the machine 50 includes one or more nozzles 250 of the nature described above. In these embodiments, the cutting unit 110 can have two or three cutters 115. In addition, the machine 50 in the present group of embodiments can optionally include two belts 200a, 200b of the nature described above. It is to be appreciated, however, that the present group of embodiments includes any embodiment where the head assembly 100 50 includes one or more nozzles 250 of the nature described above, whether or not the machine also has three cutters or any belts.

In previously discussing FIGS. 5-7, the positioning and movement of the head assembly 100 for cutting in a generally vertical (e.g., Y) direction (parallel to the Y axis of the machine 50) was addressed. In addition, the head assembly 100 can be positioned and moved for cutting in a horizontal (e.g., X) direction (parallel to the X axis of the machine 50).

When masking portions (e.g., strips) are cut in both the X direction and the Y direction, those cut portions can intersect each other. To that end, the machine 50 can be used to cut multiple intersecting strips such that they define a grid pattern bounding at least four rectangles of masking 30 that remain on the first surface 14 of the glazing pane 10'. One non-limiting example is shown in FIG. 3.

In certain embodiments (as is perhaps best shown in FIG. 11), the support carriage 105 includes an attachment flange 150 configured for attaching the masking removal mechanism 95' to the vertical beam 130. In such embodiments, the head assembly 100 preferably is rotatable (e.g., about a Z axis of the machine) relative to the attachment flange 150.

The illustrated head assembly 100 is rotatable relative to the support carriage 105. Preferably, the head assembly 100 is rotatable between a first position and a second position, which is 90 degrees from the first position. Such rotation preferably is relative to the head conveyance frame 120. Thus, the illustrated cutting unit 110 is in a first orientation when traveling in the Y direction (as shown in FIGS. 5-7) and is in a second orientation when travelling in the X direction.

As noted above, FIGS. 5-7 depict the head assembly 100 oriented to cut a portion (e.g., strip) of masking material in the Y direction. To subsequently orient the head assembly 100 to cut a portion of masking material in the X direction, the head assembly 100 can be rotated by 90 degrees about a Z axis of the machine. Thus, in certain embodiments, the head assembly 100 is rotatable about a Z axis, and movable linearly in an X direction and a Y direction (e.g., parallel to an X axis or a Y axis of the machine 50). Further, in certain embodiments, via an optional linear actuator 100a, the cutting unit 110 of the head assembly 100 is moveable linearly toward and away from the platen or other rear support 80 of the machine (e.g., parallel to a Z axis of the machine 50).

Figure 14:
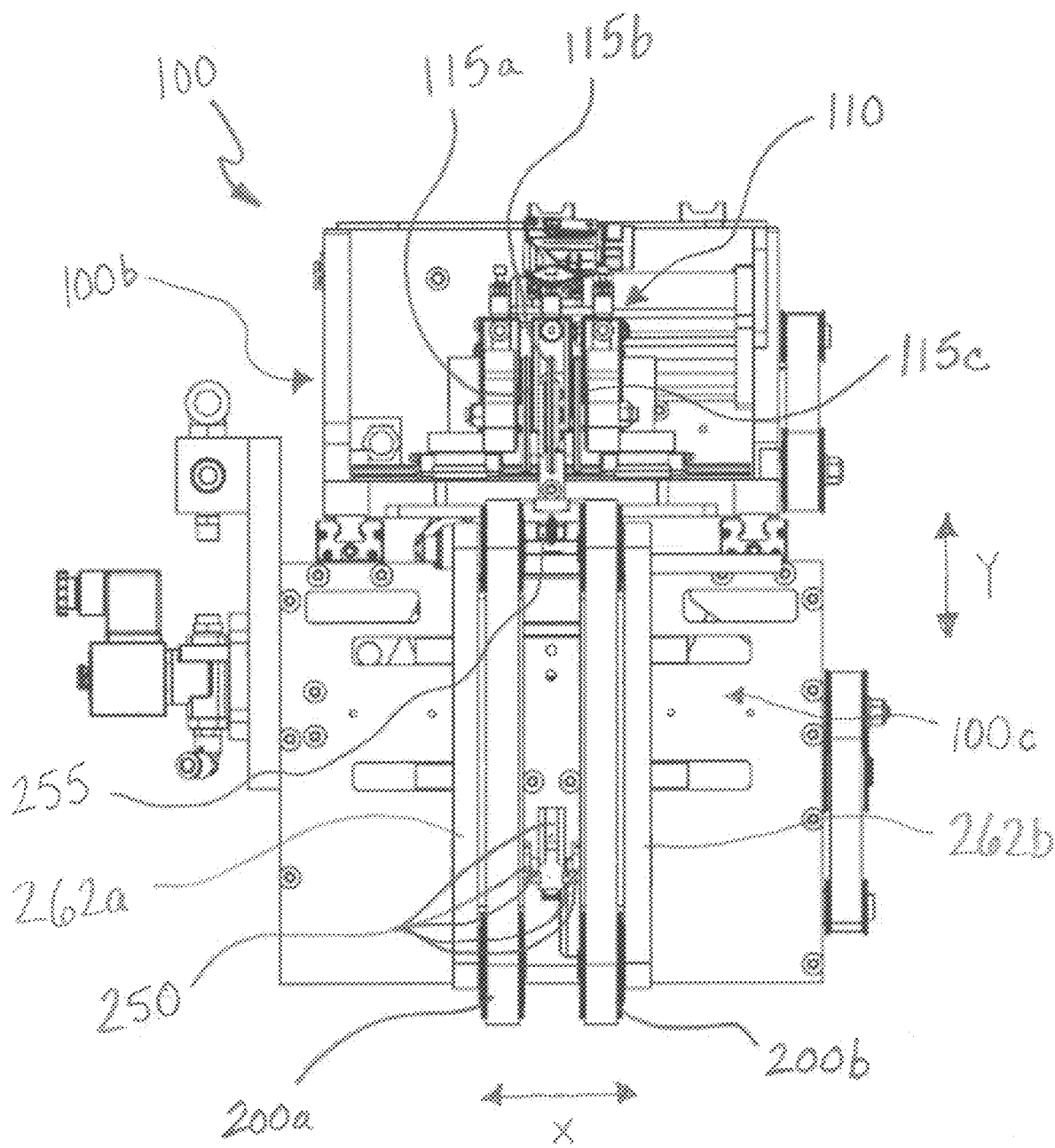
FIG. 14 is a front view of the head assembly of FIG. 12.
Figure 15:
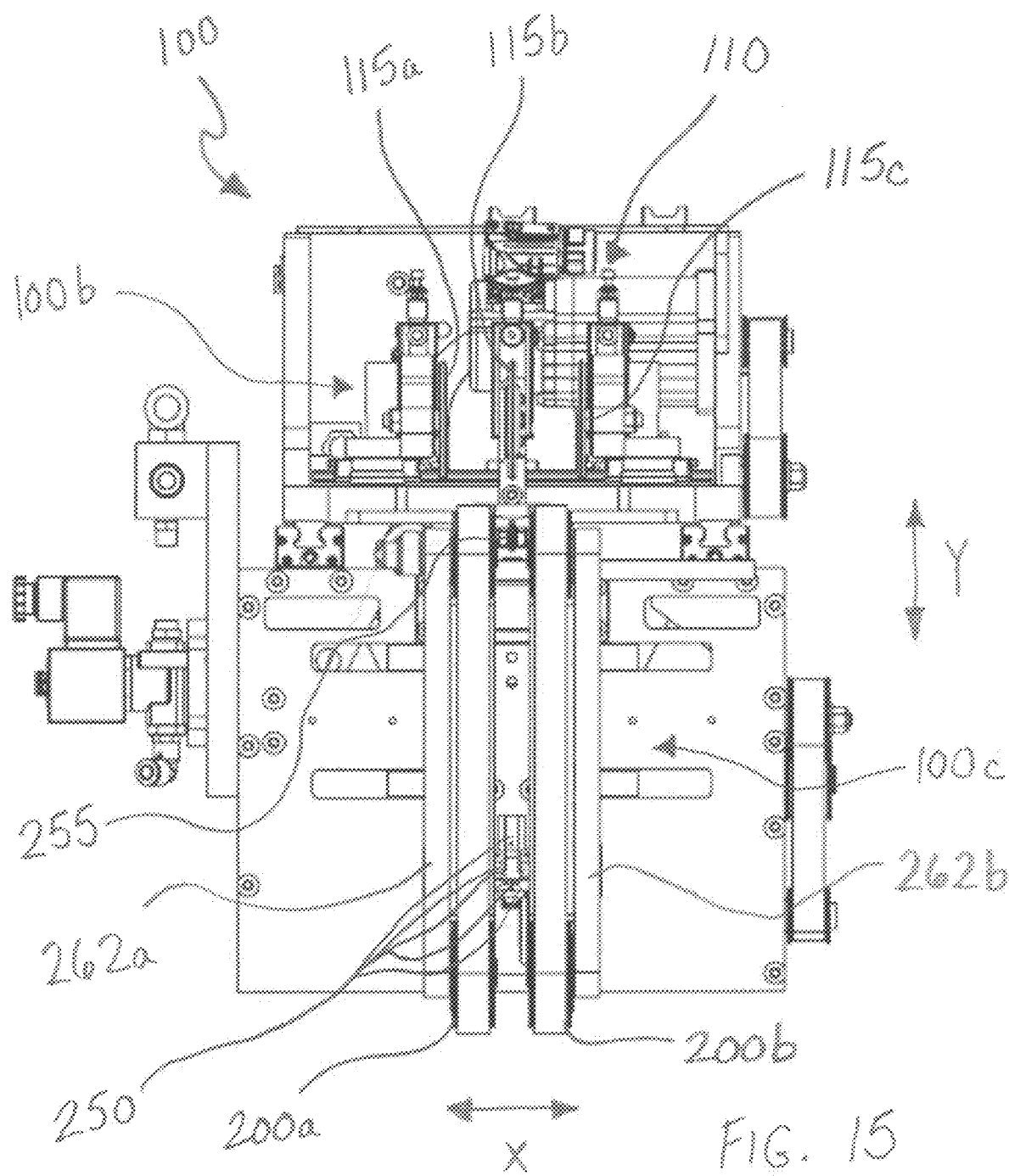
FIG. 15 is another front view of the head assembly of FIG. 12, with the two illustrated belts adjusted so as to be separated from each other by a lesser distance than in FIG. 14.

With reference to FIGS. 14-16, different configurations of the assembly 100 are shown. The separation of the belts 200a, 200b is greater in FIG. 14 than in FIG. 15, and is greater in FIG. 16 than in FIG. 14. As noted above, the spacing of the illustrated belts 200a, 200b can be selectively varied based on the size (e.g., width) of masking portions to be removed from masked glazing pane 10', which can depend on the size of the muntin bars to be mounted on the glazing pane. One non-limiting configuration is shown in FIG. 14, where the spacing of the belts 200a, 200b is slightly greater than the spacing of the two outer cutters 115a, 115c. As noted above, gas nozzles 250 can optionally be mounted to two adjustable bases 262a, 262b that respectively carry two belts 200a, 200b. In such cases, adjusting the spacing between the belts 200a, 200b simultaneously adjusts the spacing between two or more nozzles 250.

The masking removal machine 50 is configured to automatically remove strips of masking 30 from the glazing pane 10'. As such, the features of the illustrated embodiment of the machine 50, including the transport system 70, the head conveyance frame 120, and the head assembly 100, including the cutters 115, the belts 200, the gas nozzles 250, and the various actuators and motors associated therewith, may all be connected to a programmable process controller having a user interface.

In certain preferred embodiments, the machine is controlled using an industrial controller, which communicates the size of the glass and the pattern of masking to be removed. An IG unit is conveyed on the machine to its desired processing position. The head assembly then moves on the XY gantry to the location of the first cut, the preferred cutters, belts, and nozzles are controlled to their position. The preferred three cutters are extended. In embodiments of this nature, the two outside cutters are used to define the width of the cut, while the center cutter makes a center cut (which preferably is then knurled) to provide an entrance for high-pressure air (e.g., coming from a center nozzle) to peel away the masking toward the outside cuts. The preferred belts are used to hold down the desired masking at the outside of the cuts and to provide a channel to direct the stream of high-pressure air coming from the preferred nozzles. The high-pressure air is used to peel the undesired masking away from the pane (e.g., glass) surface, so that a preferred vacuum system can remove the undesired masking.

Some embodiments of the invention are automated methods of removing portions (e.g., one or more strips) of masking from a masked glazing pane using a machine, such as the machine embodiments described herein. In some embodiments, the method includes positioning a glazing pane having opposed first and second surfaces in a processing position, such that the first surface of the glazing pane is adjacent to (e.g., oriented toward) a head assembly comprising a cutting unit that has a plurality of (optionally three) cutters. Some embodiments of the present methods include operating a conveyor to move a glazing pane along a path of substrate travel to a processing position.

The present methods can include moving the head assembly, in either an X direction or a Y direction, along the first surface of the glazing pane such that two or more spaced-apart cutters make respective cuts, elongated in either the X direction or the Y direction, in a masking on the first surface of the glazing pane, to thereby cut a portion (e.g., a strip) from the masking. Certain embodiments involve moving the head assembly in either an X direction or a Y direction along the first surface of the glazing pane such that three spaced-apart cutters make three respective cuts, elongated in either the X direction or the Y direction, in a masking on the first surface of the glazing pane to thereby cut a portion from the masking. As noted above, the masking referred to in this disclosure comprises masking material, such as masking film, which preferably has an adhesive holding the masking film onto the underlying surface of the pane.

In some embodiments of the present methods, the head assembly further includes two spaced-apart belts, with the belts engaging and moving along the glazing pane to contact and press on masking intended to remain on the pane during and following removal of the masking strips. The use of such belts is detailed above.

Additionally or alternatively, in certain embodiments of the present methods, the head assembly includes one or more pressurized gas nozzles, with the nozzles moving with the head assembly relative the glazing pane while being oriented to direct pressurized gas toward the cut masking. As noted above, such nozzle operation can aid in removing the cut portion of the masking.

Still further, some embodiments of the present methods involve moving the head assembly in a Y direction along a first surface of a glazing pane such that a plurality of (e.g., three) spaced-apart cutters make respective cuts, elongated in the Y direction, in the masking on the first surface of the glazing pane, to thereby cut a first portion from the masking. The methods also preferably involve moving the head assembly in an X direction along the first surface of the glazing pane such that the spaced-apart cutters make respective cuts, elongated in the X direction, in the masking on the first surface of the glazing pane, to thereby cut a second portion from the masking. In some embodiments, the method includes moving the head assembly (e.g., in a generally vertical direction) along a vertical beam, and moving the head assembly horizontally by moving the vertical beam horizontally along two horizontal beams.

Some embodiments of the present methods include rotating the head assembly between first and second configurations. When the head assembly is in the first configuration, the plurality of cutters are operable to make respective cuts, elongated in the X direction, in the masking on the first surface of the glazing pane, to thereby cut a strip from the masking. When the cutting head is in the second configuration, the plurality of spaced-apart cutters are operable to make respective cuts, elongated in the Y direction, in the masking on the first surface of the glazing pane, to thereby cut a strip from the masking.

In other embodiments, a plurality of unmasked strips are made so as to collectively form a diamond-like pattern. In such embodiments, rather than just moving vertically and horizontally, the head assembly moves at different angles when cutting strips from the masking on the glazing pane.

In an exemplary operation, the head assembly is positioned near an edge of the glazing pane and then a first vertical portion of the masking is cut and removed. The head assembly can then be moved laterally across the pane until it reaches a location where a second vertical strip of masking is to be cut and removed. The head assembly movement can continue in this manner, sequentially cutting a plurality of vertical strips in series, until all the desired vertical portions have been cut and removed. The head assembly can then be rotated 90 degrees and moved vertically to a location where it is desired to cut a first horizontal portion. Once that first horizontal portion has been cut, the head assembly can be moved vertically until it reaches a location where it is desired to cut a second horizontal portion. The head assembly movement can proceed in this matter, sequentially cutting a plurality of horizontal strips in series, until all the desired horizontal portions have been cut and removed.

In some embodiments, the method includes operating an abrasion tool to roughen the masking film at a location where three parallel cuts have been made in the masking film. In embodiments where the abrasion tool includes a knurl tool, the method can include operating the knurl tool to knurl the masking at the location of a middle one of such three cuts in the masking film.

While some preferred embodiments of the invention have been described, it should be understood that various changes, adaptations and modifications may be made therein without departing from the spirit of the invention and the scope of the appended claims.

What is claimed is:

1. An automated masking removal machine comprising a head assembly and a processing station, the processing station constructed to retain a glazing pane in a processing position wherein a masked surface of the glazing pane is oriented toward the head assembly, the head assembly comprising a cutting unit including two spaced-part cutters constructed to engage and move along the masked surface of the glazing pane so as to make two respective cuts in a masking film of the masked surface of the glazing pane and thereby cut a portion from the masking film, the head assembly further comprising two spaced-apart belts constructed to engage and move along the masked surface of the glazing pane.

2. The automated masking removal machine of claim 1 wherein the cutting unit is located on a leading portion of the head assembly and the two belts are located on a trailing portion of the head assembly, such that the automated masking removal machine is constructed to move the head assembly along the masked surface of the glazing pane with the two cutters ahead of the two belts.

3. The automated masking removal machine of claim 1 wherein the two belts are spaced further apart from each other than are the two cutters, the two belts constructed to engage and move along the masked surface of the glazing pane so as to apply pressure to the masking film that is to remain on the masked surface and thereby prevent edges of the masking film adjacent the cuts from bubbling or being lifted off the masked surface.

4. The automated masking removal machine of claim 1 further comprising one or more pressurized gas nozzles located between the two belts.

5. The automated masking removal machine of claim 4 wherein the one or more nozzles comprise at least three nozzles.

6. The automated masking removal machine of claim 4 wherein the one or more nozzles include two adjustable nozzles spaced apart from each other by a width, the two adjustable nozzles mounted on the head assembly adjustably such that the width can be changed by moving the two adjustable nozzles closer together or further apart.

7. The automated masking removal machine of claim 1 wherein the two belts are mounted on the cutting head such that a separation distance between them is adjustable.

8. The automated masking removal machine of claim 7 wherein each of the two belts is mounted on a pair of rotatable sprockets, such that there are two pairs of rotatable sprockets and each of the two belts is constructed to circulate on a respective one of the two pairs of rotatable sprockets.

9. The automated masking removal machine of claim 8 wherein the two pairs of rotatable sprockets are mounted respectively on two adjustable bases, the two adjustable bases mounted on the head assembly so as to be moveable toward or away from each other.

10. The automated masking removal machine of claim 9 further comprising at least one gas nozzle mounted on each of the two adjustable bases.

11. An automated masking removal machine comprising a head assembly and a processing station, the processing station constructed to retain a glazing pane in a processing position wherein a masked surface of the glazing pane is oriented toward the head assembly, the head assembly comprising a cutting unit including two spaced-part cutters constructed to engage and move along the masked surface of the glazing pane so as to make two respective cuts in a masking film of the masked surface of the glazing pane and thereby cut a portion from the masking film, the two cutters spaced apart by an adjustable width, the head assembly further comprising a plurality of nozzles positioned to deliver one or more pressurized gas streams toward the portion cut from the masking film, wherein the plurality of nozzles includes two adjustable nozzles spaced apart from each other by a separation width, the separation width of the two adjustable nozzles measured parallel to the adjustable width of the two cutters, the two adjustable nozzles mounted on the head assembly adjustably such that the separation width can be changed by moving the two adjustable nozzles closer together or further apart, wherein the two adjustable nozzles are mounted respectively on two bases having between them a spacing that can be changed, such that changing the spacing between the two bases changes the separation width between the two adjustable nozzles.

12. The automated masking removal machine of claim 11 wherein the plurality of nozzles is operable at a pressure of greater than 175 psi.

13. The automated masking removal machine of claim 12 wherein the pressure is about 200 psi or more.

14. The automated masking removal machine of claim 11 wherein the plurality of nozzles comprises five nozzles.

15. The automated masking removal machine of claim 11 wherein the head assembly further comprises two spaced-apart belts constructed to engage and move along the masked surface of the glazing pane.

16. The automated masking removal machine of claim 15 wherein each of the two belts is mounted on a pair of rotatable sprockets, such that there are two pairs of rotatable sprockets and each of the two belts is constructed to circulate on a respective one of the two pairs of rotatable sprockets, wherein the two rotatable sprockets are mounted respectively on two adjustable bases, and the two adjustable bases are mounted on the head assembly so as to be moveable toward or away from each other, and further comprising at least one gas nozzle mounted on each of the two adjustable bases.

17. An automated masking removal machine comprising a head assembly and a processing station, the processing station constructed to retain a glazing pane in a processing position wherein a masked surface of the glazing pane is oriented toward the head assembly, the head assembly comprising a cutting unit including three spaced-apart cutters constructed to engage and move along the masked surface of the glazing pane so as to make three respective cuts in a masking film of the masked surface of the glazing pane and thereby cut a portion from the masking film, such that the three cuts are two outer cuts and a central cut, the three cutters including two outside cutters and a central cutter, the two outside cutters configured to make the two outer cuts, and the central cutter configured to make the central cut, the central cutter being located between the two outside cutters, the head assembly further comprising one or more nozzles positioned to deliver one or more pressurized gas streams toward the portion cut from the masking film, and the cutting unit further comprising a knurling tool, the knurling tool being aligned with the central cutter such that the knurling tool is positioned to act on the masking film at the central cut to provide an entrance for high-pressure air from the one or more nozzles such that two resulting cut-strip halves of the portion cut from the masking film are blown up and away from each other and off the masked surface of the glazing pane.

18. The automated masking removal machine of claim 17 wherein the two outside cutters are two adjustable cutters, and the central cutter is a fixed central cutter, such that the two adjustable cutters are spaced apart by an adjustable width.

19. The automated masking removal machine of claim 17 wherein the three cutters are located on a leading portion of the cutting unit and the knurling tool is located on a trailing portion of the cutting unit, such that the automated masking removal machine is constructed to move the cutting unit along the masked surface of the glazing pane with the three cutters ahead of the knurling tool.

20. The automated masking removal machine of claim 17 wherein the one or more nozzles are operable at a pressure of greater than 175 psi.

21. The automated masking removal machine of claim 18 wherein the one or more nozzles include two adjustable nozzles spaced apart from each other by a separation width, the two adjustable nozzles mounted on the cutting head adjustably such that the separation width can be changed by moving the two adjustable nozzles closer together or further apart, the separation width of the two adjustable nozzles measured parallel to the adjustable width of the two adjustable cutters.

22. The automated masking removal machine of claim 19 wherein the head assembly further comprises two spaced-apart belts constructed to engage and move along the masked surface of the glazing pane.

23. The automated masking removal machine of claim 1 wherein the two spaced-apart belts are continuous belts rotatably mounted to the head assembly of the automated masking removal machine.

24. The automated masking removal machine of claim 11 wherein all nozzles of the plurality of nozzles are located between the two bases.

25. The automated masking removal machine of claim 11 wherein each of the two bases extends from a leading end adjacent the cutting unit to a trailing end that is further from the cutting unit than is the plurality of nozzles.

26. The automated masking removal machine of claim 11 wherein the plurality of nozzles includes: a first nozzle positioned at an angle of about 30-60 degrees relative to the masked surface of the glazing pane, a second nozzle positioned at a different angle of about 30-60 degrees relative to the masked surface of the glazing pane, and one or more nozzles configured to direct pressurized gas perpendicular to the masked surface of the glazing pane.

27. The automated masking removal machine of claim 11 wherein the plurality of nozzles includes: three nozzles that are located closest to the cutting unit and are each oriented to direct a pressurized gas stream at an angle of about 30-60 degrees with respect to the masked surface of the glazing pane, and two nozzles that are located furthest from the cutting unit and are configured to direct pressurized gas perpendicular to the masked surface of the glazing pane.

28. The automated masking removal machine of claim 11 wherein the one or more pressurized gas streams from the plurality of nozzles are operable, without also using a separate mechanical picker, to lift and disengage the portion cut from the masking film away from and off the glazing pane.

29. The automated masking removal machine of claim 17 wherein the one or more nozzles are operable at a pressure of about 200 psi or more.

* * * * *